United States Patent
Aisu

(10) Patent No.: US 11,397,442 B2
(45) Date of Patent: Jul. 26, 2022

(54) TRAVEL PLANNING SYSTEM, TRAVEL PLANNING METHOD, AND NON-TRANSITORY COMPUTER READABLE MEDIUM

(71) Applicant: KABUSHIKI KAISHA TOSHIBA, Minato-ku (JP)

(72) Inventor: Hideyuki Aisu, Kawasaki (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 198 days.

(21) Appl. No.: 16/564,539

(22) Filed: Sep. 9, 2019

(65) Prior Publication Data
US 2020/0293063 A1  Sep. 17, 2020

(30) Foreign Application Priority Data
Mar. 13, 2019 (JP) .............................. JP2019-046459

(51) Int. Cl.
G05D 1/02 (2020.01)
G05D 1/00 (2006.01)
H04L 67/12 (2022.01)

(52) U.S. Cl.
CPC ......... G05D 1/0287 (2013.01); G05D 1/0088 (2013.01); H04L 67/12 (2013.01)

(58) Field of Classification Search
CPC ..... G05D 1/0287; G05D 1/0088; H04L 67/12
See application file for complete search history.

(56) References Cited

U.S. PATENT DOCUMENTS 5,038,290 A    8/1991 Minami
5,283,739 A *  2/1994 Summerville ....... G05D 1/0289
                                            180/168
(Continued)

FOREIGN PATENT DOCUMENTS

JP    2-77808 A    3/1990
JP    7-19177 B2   3/1995
(Continued)

OTHER PUBLICATIONS

Notice of Reasons for Refusal (English Translated) for Application No. JP2019046459. Retrieved from Global Dossier. Retrieved Aug. 19, 2021. (Year: 2021).*

*Primary Examiner* — Calvin Cheung
(74) *Attorney, Agent, or Firm* — Oblon, McClelland, Maier & Neustadt, L.L.P.

(57) ABSTRACT

According to one embodiment, a travel planning system for a plurality of mobile objects which travel in a travel network including a plurality of traveling paths includes first processing circuitry and second processing circuitry. The first processing circuitry generates a plurality of traveling timing schedules including timings of traveling on the traveling paths for the plurality of mobile objects under a condition that conflict among the mobile objects does not occur on the traveling paths, based on: position information of the plurality of mobile objects; structure information of the travel network; and a plurality of route plans which designates order of passing through one or more designated areas in the travel network for the plurality of mobile objects. The second processing circuitry transmits movement command data for the plurality of mobile objects on a basis of the plurality of traveling timing schedules.

18 Claims, 16 Drawing Sheets

(56) References Cited

U.S. PATENT DOCUMENTS

| | | |
|---|---|---|
| 5,625,559 A | 4/1997 | Egawa |
| 7,801,641 B2 | 9/2010 | Yoshikawa et al. |
| 7,873,469 B2 | 1/2011 | D'Andrea et al. |
| 7,920,962 B2 | 4/2011 | D'Andrea et al. |
| 8,068,978 B2 | 11/2011 | D'Andrea et al. |
| 9,811,090 B2 | 11/2017 | Yoneda |
| 2014/0100735 A1* | 4/2014 | Yoneda ................ G06Q 10/047 701/25 |

FOREIGN PATENT DOCUMENTS

| | | |
|---|---|---|
| JP | 7-160333 A | 6/1995 |
| JP | 2953282 B2 | 9/1999 |
| JP | 2000-285373 A | 10/2000 |
| JP | 3279034 B2 | 4/2002 |
| JP | 3364021 B2 | 1/2003 |
| JP | 2006-312514 A | 11/2006 |
| JP | 4138541 B2 | 8/2008 |
| WO | WO 2013/005467 A1 | 1/2013 |

\* cited by examiner

DEADLOCK         COLLISION

L , K, I, G, E, C, A, B, A, C, D, F, E, G, H, J, I, K, M, K, I, G, E, C, A, B, A, C, D, F, E, G, H, J, I, K, L

ROUTE PLAN: EXAMPLE 1

FIG. 6A

L- Load, K, I, G, E, C, A, B-UnLoad, A, C, D, F, E, G, H, J, I, K, M-Load, K, I, G, E, C, A, B-UnLoad, A, C, D, F, E, G, H, J, I, K, L

ROUTE PLAN: EXAMPLE 2

FIG. 6B

EXAMPLE OF TRAVELING TIMING SCHEDULES OF MOBILE OBJECTS AGV 0, AGV 1 AND AGV 2

AGV0
MOVE-L-K-70.0, MOVE-K-I-37.0, MOVE-I-G-10.0, WAIT-52.0, MOVE-G-E-36.0, MOVE-E-C-10.0, WAIT-233.0, MOVE-C-A-47.0, MOVE-A-B-45.0, WAIT-130.0, MOVE-B-A-45.0, MOVE-A-C-47.0, MOVE-C-D-5.0, MOVE-D-E-10.0, MOVE-E-G-36.0, MOVE-G-H-5.0, MOVE-H-J-10.0, MOVE-J-I-5.0, MOVE-I-K-37.0, MOVE-K-M-104.0, WAIT-40.0, MOVE-M-K-104.0, MOVE-K-I-37.0, MOVE-I-G-10.0, WAIT-4.0, MOVE-G-E-36.0, MOVE-E-C-10.0, WAIT-233.0, MOVE-C-A-47.0, MOVE-A-B-45.0, WAIT-130.0, MOVE-B-A-45.0, MOVE-A-C-47.0, MOVE-C-D-5.0, MOVE-D-F-10.0, MOVE-F-E-5.0, MOVE-E-G-36.0, MOVE-G-H-5.0, MOVE-H-J-10.0, MOVE-J-I-5.0, MOVE-I-K-37.0, MOVE-K-L-70.0,

AGV1
MOVE-B-A-45.0, MOVE-A-C-47.0, MOVE-C-D-5.0, MOVE-D-F-10.0, MOVE-F-E-5.0, MOVE-E-G-36.0, MOVE-G-H-5.0, MOVE-H-J-10.0, MOVE-J-I-5.0, MOVE-I-K-37.0, MOVE-K-M-104.0, WAIT-40.0, MOVE-M-K-104.0, MOVE-K-I-37.0, MOVE-I-G-10.0, WAIT-4.0, MOVE-G-E-36.0, MOVE-E-C-10.0, WAIT-233.0, MOVE-C-A-47.0, MOVE-A-B-45.0, WAIT-130.0, MOVE-B-A-45.0, MOVE-A-C-47.0, MOVE-C-D-5.0, MOVE-D-F-10.0, MOVE-F-E-5.0, MOVE-E-G-36.0, MOVE-G-H-5.0, MOVE-H-J-10.0, MOVE-J-I-5.0, WAIT-8.0, MOVE-I-K-37.0, M-K-M-104.0, WAIT-40.0, MOVE-M-K-104.0, MOVE-K-I-37.0, MOVE-I-G-10.0, MOVE-G-E-36.0, MOVE-E-C-10.0, WAIT-229.0, MOVE-C-A-47.0, MOVE-A-B-45.0,

AGV2
MOVE-K-I-37.0, MOVE-I-G-10.0, MOVE-G-E-36.0, MOVE-E-C-10.0, WAIT-20.0, MOVE-C-A-47.0, MOVE-A-B-45.0, WAIT-130.0, MOVE-B-A-45.0, MOVE-A-C-47.0, MOVE-C-D-5.0, MOVE-D-F-10.0, MOVE-F-E-5.0, MOVE-E-G-36.0, MOVE-G-H-5.0, MOVE-H-J-10.0, MOVE-J-I-5.0, WAIT-8.0, MOVE-I-K-37.0, MOVE-K-L-70.0, MOVE-L-K-70.0, MOVE-K-I-37.0, MOVE-I-G-10.0, WAIT-64.0, MOVE-G-E-36.0, MOVE-E-C-10.0, WAIT-233.0, MOVE-C-A-47.0, MOVE-A-B-45.0, WAIT-130.0, MOVE-B-A-45.0, MOVE-A-C-47.0, MOVE-C-D-5.0, MOVE-D-F-10.0, MOVE-F-E-5.0, MOVE-E-G-36.0, MOVE-G-H-5.0, MOVE-H-J-10.0, MOVE-J-I-5.0, WAIT-16.0, MOVE-I-K-37.0,

FIG. 7

L   DEPARTURE : 0

K   ARRIVAL : 70, DEPARTURE : 70

I   ARRIVAL : 107, DEPARTURE : 107

G   ARRIVAL : 117, DEPARTURE : 169

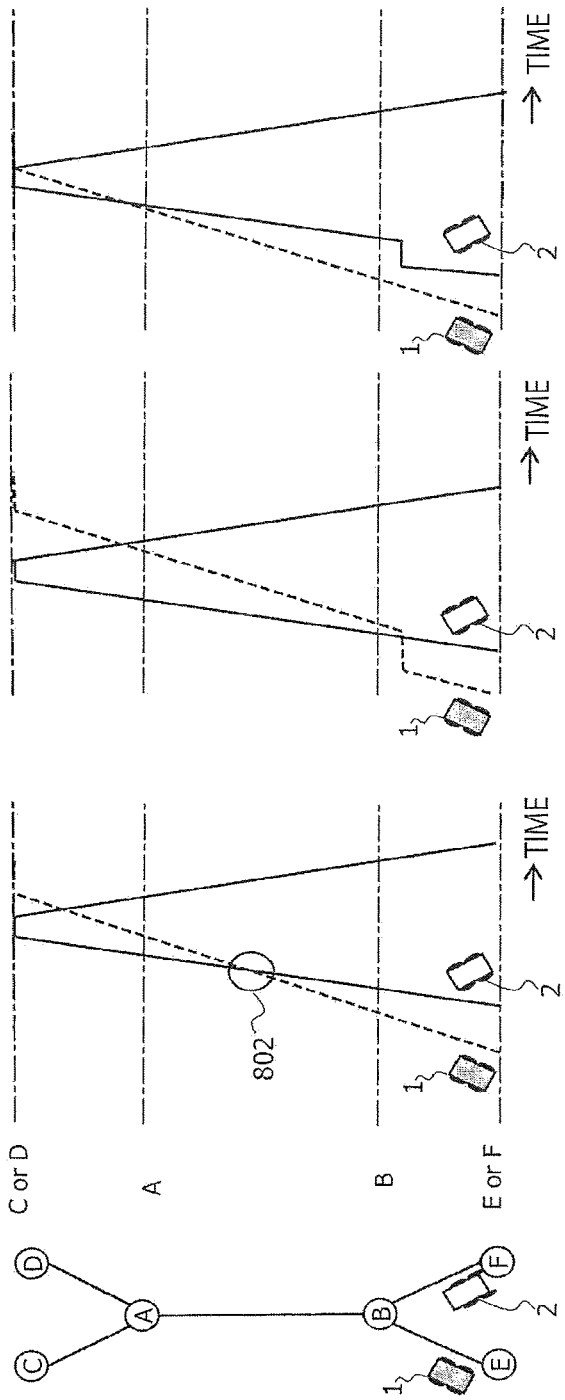

TRAVEL PLANNING SYSTEM, TRAVEL PLANNING METHOD, AND NON-TRANSITORY COMPUTER READABLE MEDIUM

CROSS REFERENCE TO RELATED APPLICATIONS

This application is based upon and claims the benefit of priority from the prior Japanese Patent Application No. 2019-046459, filed on Mar. 13, 2019, the entire contents of which are incorporated herein by reference.

FIELD

The present disclosure relates to a travel planning system, a travel planning method, and a non-transitory computer readable medium.

BACKGROUND

In recent years, along with generalization of high-mix low-volume production, flexibility has been required in production process. For example, respective steps in a production line are modularized and freely reassembled, an AGV (Automatic Guided Vehicle) performs conveyance between the steps, and a working mobile robot with an arm is caused to work while moving among a plurality of work areas.

Further, with a serious manpower shortage at logistics sites as background, approaches for saving manpower are accelerating in distribution centers of online shopping, and the like. For example, the approaches include combination of: an AGV or an autonomous traveling forklift; and a picking robot.

Still further, along with development of autonomous driving technology of vehicles, trials for autonomous valet parking in which vehicles are caused to autonomously travel and park at a parking area in an unmanned state have reached practical use. Also, traveling of an unmanned construction mobile object which is remotely operated at a construction site, a mine, or the like, have reached practical use.

To efficiently control movement of a number of autonomous traveling mobile objects in a narrow area, it is necessary to avoid conflict among the mobile objects, such as a collision and/or deadlock. Until now, the conflict has been typically avoided by providing in advance traveling paths with a plurality of lines on which mobile objects can travel in both directions at the same time, a plurality of one-way loops, and dedicated traveling paths and traveling space in a grid shape, or the like.

In a related art, on the assumption that such dedicated traveling paths, or the like, are used, a plan is made so that movement in reverse directions on the same traveling path does not occur in all paths of the mobile objects. However, in a case where a stepwise introduction is promoted while existing paths which are also used by workers are diverted, a system which can generally make a travel plan is required in the following cases: a case where traveling paths of a shape in which movement in the both directions occurs is used, and a case where a path on which movement in both directions occurs is designated in advance for a reason of safety, or the like. It is difficult to apply the above-described related art under this condition.

Further, as another related art, a traveling plan of a mobile object is determined (a mobile object is reserved) one by one, and a traveling plan of the next mobile object is determined so that traveling in a direction reverse to that of the mobile object reserved previously does not occur. In this related art, there has been a problem that traveling efficiency is largely affected by reservation order of mobile objects, which degrades entire efficiency.

Further, use of dedicated traveling paths, or the like, requires construction cost, and there is also a problem that stepwise change of traveling path layout after utilization is started is not easy.

BRIEF DESCRIPTION OF THE DRAWINGS

FIGS. 6A and 6B each is a diagram illustrating an example of a route plan;

FIG. 7 is a diagram illustrating an example of a travel timing schedule of each of a plurality of mobile objects;

FIG. 8 illustrates an example of part of a travel plan;

FIGS. 12A to 12D show a diagram illustrating another example of the conflict check and avoidance processing;

DETAILED DESCRIPTION

According to one embodiment, a travel planning system for a plurality of mobile objects which travel in a travel network including a plurality of traveling paths includes first processing circuitry and second processing circuitry.

The first processing circuitry generates a plurality of traveling timing schedules including timings of traveling on the traveling paths for the plurality of mobile objects under a condition that conflict among the mobile objects does not occur on the traveling paths, based on: position information of the plurality of mobile objects; structure information of the travel network; and a plurality of route plans which designates order of passing through one or more designated areas in the travel network for the plurality of mobile objects.

The second processing circuitry transmits movement command data for the plurality of mobile objects on a basis of the plurality of traveling timing schedules.

Below, embodiments will be described below with reference to the drawings.

First Embodiment

Figure 1:
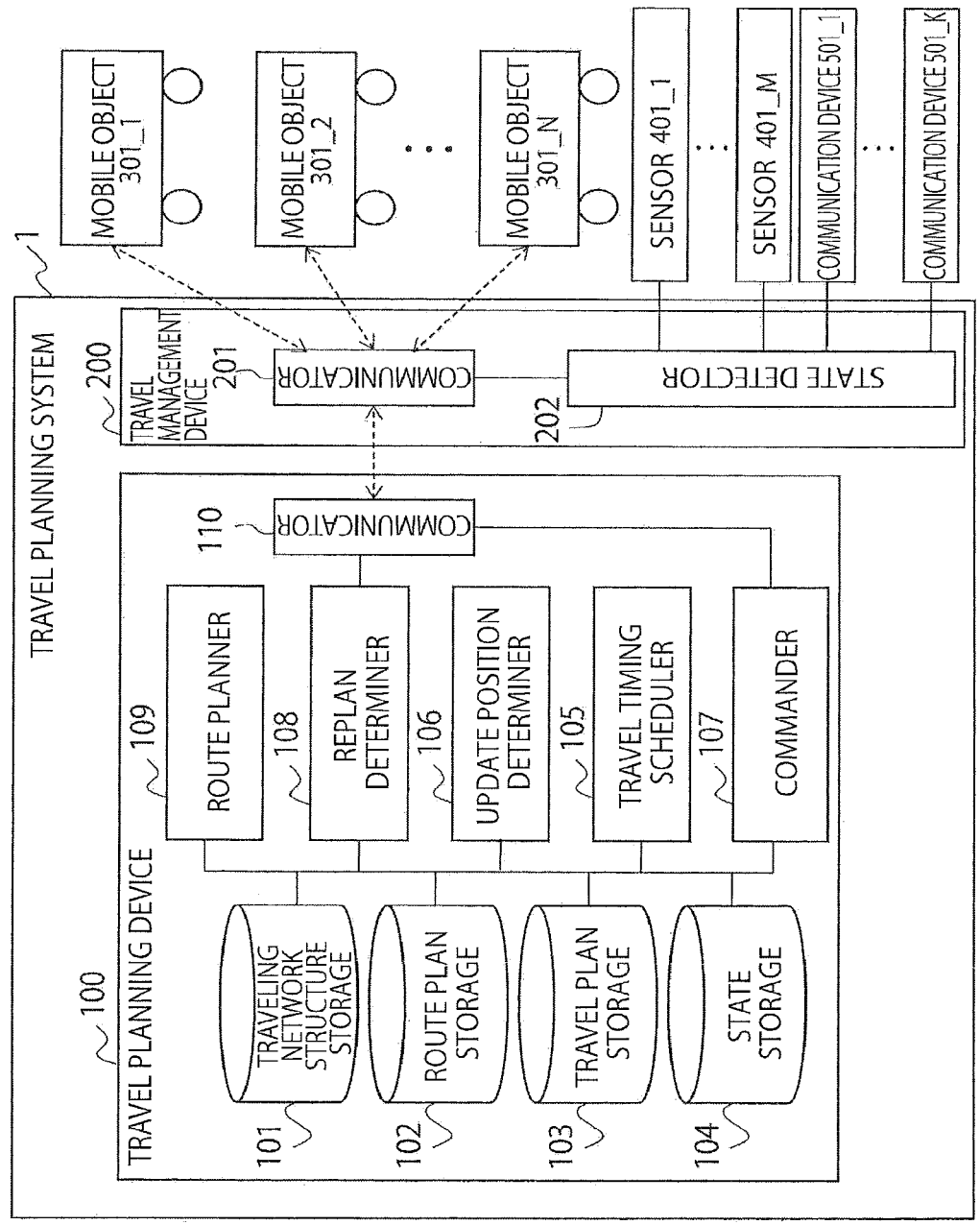
FIG. 1 is a diagram illustrating an example of an entire system configuration of a travel planning system according to a first embodiment.

FIG. 1 illustrates an example of an entire system configuration including a travel planning system according to a first embodiment. The entire system configuration includes a travel planning system 1, a plurality of mobile objects (or mobile entities) 301_1 to 301_N, a plurality of sensors 401_1 to 401_M, and a plurality of communication devices 501_1 to 501_K. The travel planning system 1 includes a travel planning device 100 and a travel management device 200. An arbitrary mobile object will be described as a mobile object 301. An arbitrary sensor will be described as a sensor 401. An arbitrary communication device will be described as a communication device 501.

The travel planning device 100 and the travel management device 200 may exist on the same computer system. Alternatively, the travel planning device 100 and the travel management device 200 may exist on different computer systems and may be connected to each other via a network.

The travel planning system 1 efficiently controls operation of a number of mobile objects autonomously traveling at low speed in a travel network including a plurality of traveling paths disposed in a narrow area as a whole so that conflict such as deadlock and a collision does not occur.

The mobile objects 301_1 to 301_N are mobile objects which can autonomously move such as AGVs (Automatic Guided Vehicles), autonomous mobile robots, and autonomous traveling vehicles (for example, autonomous traveling vehicles). The mobile objects 301_1 to 301_N travel in a travel network disposed in an area such as, for example, in a factory, in a warehouse, and in a facility site. The mobile objects 301_1 to 301_N include storage batteries (batteries) as an example, and operate using power stored in the batteries.

Figure 2:
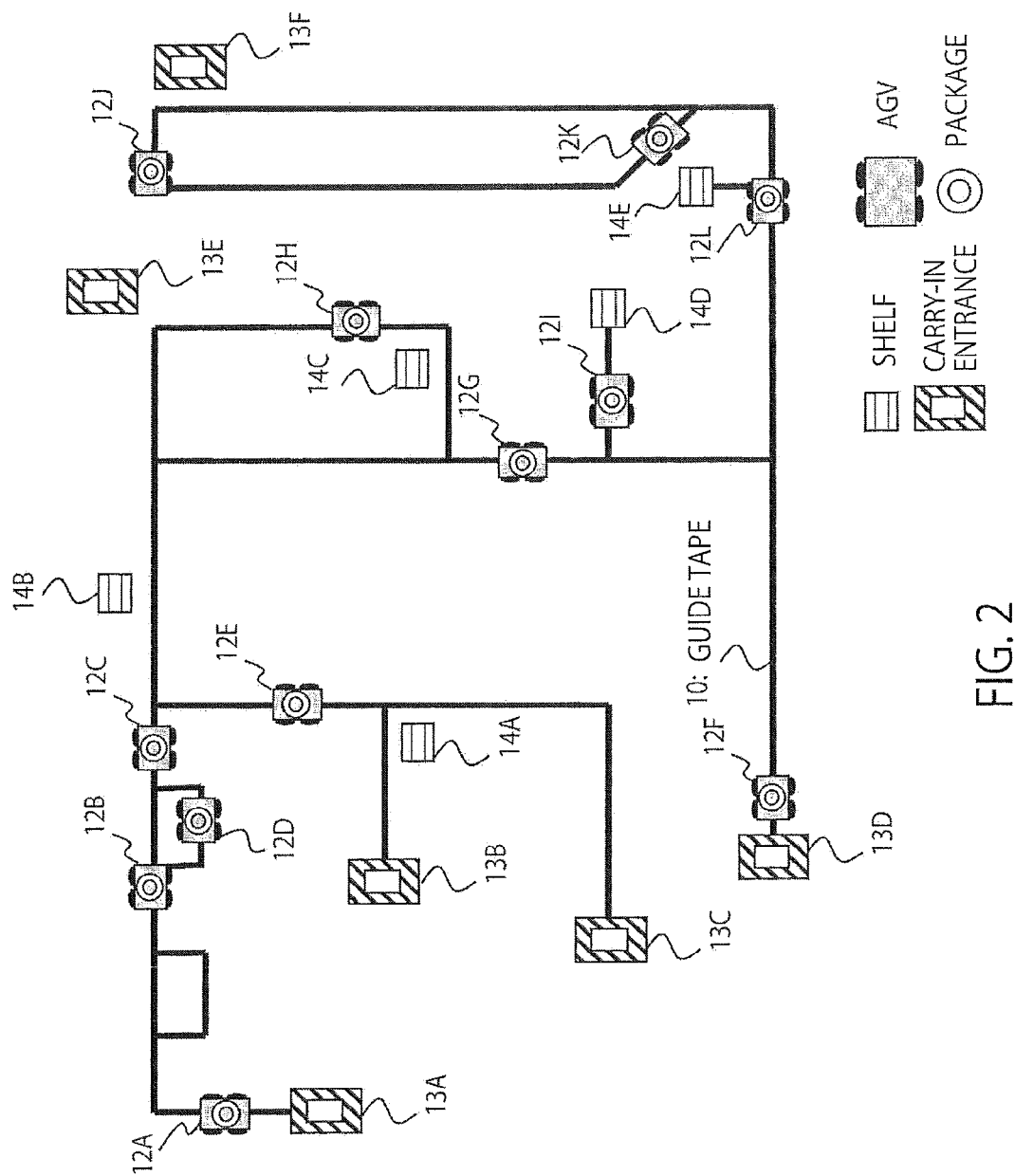
FIG. 2 is a diagram illustrating an example where a plurality of mobile objects travel in a travel network.

FIG. 2 is a top view schematically illustrating aspect where operation of a plurality of mobile objects is controlled in the travel network. The travel network using guide tapes 10 is disposed on a floor of a certain facility. The travel network is configured by linear guide tapes 10 being combined as traveling paths. While, in this example, individual traveling paths have a linear shape, the shape is merely an example. The traveling paths may have a curved shape or a shape in which a linear line and a curved line are combined. Note that there are a plurality of methods other than the method using guide tapes, such as a method in which markers are disposed at points on the traveling paths, and a method in which the mobile object itself detects an own position and travels on a virtual travel network. The method for realizing the travel network is not limited here.

The mobile objects 12A, 12B, 12C, 12D, 12E, 12F, 12G, 12H, 12I, 123, 12K and 12L, which correspond to the mobile object 301 in FIG. 1, can move in an anterior direction, in a posterior direction or both in the anterior direction and in the posterior direction along the guide tapes 10. The mobile objects may be configured to be able to rotate so that an anterior portion and a posterior portion are inverted. Further, the mobile objects may be configured to be able to move in directions other than the anterior direction and the posterior direction, such as an oblique direction depending on a shape of the traveling path. Carry-in entrances 13A, 13B, 13C, 13D, 13E and 13F and shelves 14A, 14B, 14C, 14D and 14E are provided at end portions of the traveling paths, near intersection portions (for example, junction portions) of the traveling paths, in midstream of the traveling paths (between both ends of the traveling paths) and other arbitrary portions. At all or part of the shelves 14A to 14E and the carry-in entrances 13A to 13F located at the end portions of the traveling paths, near the intersection portions of the traveling paths, in midstream of the traveling paths (between the both ends of the traveling paths) and at other arbitrary portions, sensors 401 and communication devices 501 (not illustrated in FIG. 2) in FIG. 1 are disposed.

The mobile objects 12A to 12L move on the respective traveling paths under management by the travel planning system 1 in FIG. 1 and do work instructed in advance. For example, the mobile objects 12A to 12L receive package from the carry-in entrances, carry the received baggage to the shelves and pile up the package. Further, the mobile objects 12A to 12L carry down the package from the shelves and carry the package to the carry-in entrances. Double circles in the drawing schematically indicate the package. Each mobile object automatically performs the movement and work on the basis of movement command data provided from the travel planning system 1. Note that the work is not limited to conveyance of package, and can be merely movement without work.

The travel planning device 100 according to the present embodiment generates a route plan indicating a plurality of paths (i.e., a route) on which each mobile object should travel on the basis of content of work and order of work to be done by each mobile object. There is also a case where a route plan of each mobile object is provided in advance. The travel planning device 100 generates a travel timing schedule in which timings of travel of each mobile object on traveling paths are included on the basis of the route plan so that a collision or deadlock does not occur at each mobile object. The travel management device 200 controls operation of each mobile object by transmitting the movement command data based on the travel timing schedule of each mobile object to each mobile object. Further, the travel management device 200 detects a traveling state of each mobile object and manages operation of each mobile object.

Here, the deadlock is a state where an arbitrary mobile object cannot move to an arbitrary intersection portion (for example, a junction portion) or to an end portion of a traveling path in the traveling network. The collision is contact between a mobile object and another mobile object.

Figure 3A:
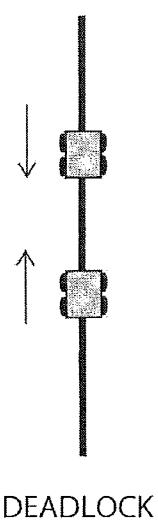
FIGS. 3A and 3B each is a diagram illustrating an example of conflict occurring between mobile objects.
Figure 3B:
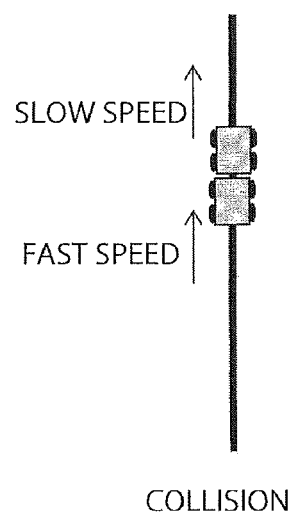

FIG. 3A illustrates an example of the deadlock, and FIG. 3B illustrates an example of the collision. In FIG. 3A, two mobile objects travel in directions reverse to each other on the same traveling path. It is assumed that the two mobile objects can only move forward. In this case, the two mobile objects cannot move to an arbitrary intersection portion or end portion, and deadlock occurs. In FIG. 3B, while two mobile objects travel in the same direction on the same traveling path, because speed of the mobile object which travels behind is higher than speed of the mobile object which travels ahead, the mobile object which travels behind collides with the mobile object which travels ahead.

Occurrence of deadlock or a collision in this manner will be expressed as conflict (or interference) between mobile objects. However, the conflict is not limited to this example. For example, the conflict may be arrival of two mobile objects at an intersection portion (junction portion) at the same time. Further, the conflict may be a state where, in a state where one or more mobile objects wait at an intersection portion leading to a traveling path, another mobile object travels on the traveling path.

The travel planning system 1 in FIG. 1 realizes efficient operation of the respective mobile objects without causing conflict (such as a collision or deadlock) among the respective mobile objects.

The travel planning device 100 in FIG. 1 includes a traveling network structure storage 101, a route plan storage 102, a travel plan storage 103, a state storage 104, a travel timing scheduler 105, an update position determiner 106, a commander 107, a replan determiner 108, a route planner 109 and communicator 110. An input device (for example, a mouse, a keyboard or a touch panel) for a user of the present device 100 to input various kinds of instructions or data may be provided. Further, a display device (for example, a liquid crystal display or an organic electroluminescence display) which displays data within each storage or data generated at each part may be provided in the device 100.

The elements included in the travel planning device 100 may be configured by one or more circuitry. For example, the elements 105, 106, 108, 109 may be configured by first processing circuitry, and the element 107 may be configured by second processing circuitry. The element 100 may be configured by communication circuitry. Any combinations of the first processing circuitry, the second processing circuitry and the communication circuitry may be physically same hardware or may be different hardware. The other hardware configuration may be possible.

The communicator 110 of the travel planning device 100 performs communication with a communicator 201 of the travel management device 200. Communication between the communicator 110 and the communicator 201 may be wireless communication or wired communication. The communicator 201 of the travel management device 200 performs communication with the communicator 110 of the travel planning device 100 and the mobile object 301. Communication between the communicator 201 and the mobile object 301 is wireless communication. However, wired communication is not excluded. Part or all of the mobile objects 301 may not perform communication with the communicator 201. However, also in this case, the mobile object 301 can perform communication with the communication device 501 (which will be described later) provided on any path side. The mobile object 301 can perform communication with the communication device 501 within a communication possible range of the communication device 501. In a case where the travel planning device 100 and the travel management device 200 are the same device, the communicator 110 may be omitted.

The traveling network structure storage 101 stores information indicating a structure of the travel network (traveling network structure information) inside. The traveling network structure information can be expressed as a graph structure including, for example, a plurality of nodes and a plurality of arcs (traveling paths) connecting between the nodes.

Figures 4A, 4B, 4C:
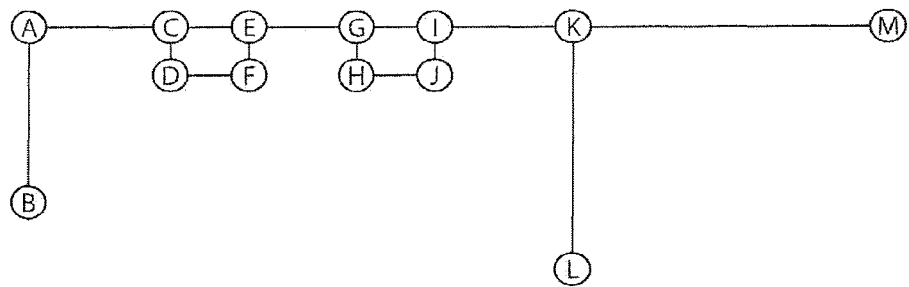
FIGS. 4A to 4C show a diagram illustrating an example of traveling network structure information.

FIGS. 4A to 4C illustrate an example of the traveling network structure information. Individual traveling paths are indicated with lines coupling between the nodes. Each circle in FIG. 4A indicates a node, a line connecting between the circles indicates an arc (traveling path). The node indicates an end portion of a traveling path, and an intersection portion of traveling paths. A portion (or an area) designated in advance in the travel network will be referred to as a designated area. A position (or an area) arbitrarily determined by the user can be set as the designated area. An arbitrary position (or an arbitrary area) such as a position where package is to be piled up or to be carried down and a waiting position can be designated as the designated area. As an example, the position includes an end portion of the traveling path leading to the intersection portion, an end portion of the traveling path not leading to the intersection portion (dead end of the traveling path). In addition, an arbitrary position of the traveling path (for example, an arbitrary position between both ends of the traveling path) may be set as the designated area. The intersection portion itself may be set as the designated area. The mobile object passes through the designated area or temporarily stays in the designated area. Examples where the mobile object temporarily stays may include temporary stop for working, temporary stop for waiting until another mobile object passes through the traveling path, stop until the next work occurs while there is no work to be done, waiting for charging a battery mounted on the mobile object, parking in a case where the mobile object is an autonomous driving vehicle, or the like.

FIG. 4B indicates node IDs, X coordinate and Y coordinate as detailed information of the nodes. For example, coordinate of the node A is (X, Y)=(20, 20).

FIG. 4C indicates traveling path IDs, and IDs of nodes at both ends of the traveling paths as detailed information of the traveling paths. For example, an ID of the traveling path between the nodes A and B is 1, and the nodes at both ends of the traveling path are A and B. A distance between nodes (distance of an arc) may be included in the traveling network structure information in association with the traveling path ID. Alternatively, the distance of the arc may be calculated on the basis of positions of the nodes at the both sides.

Figures 5A, 5B:
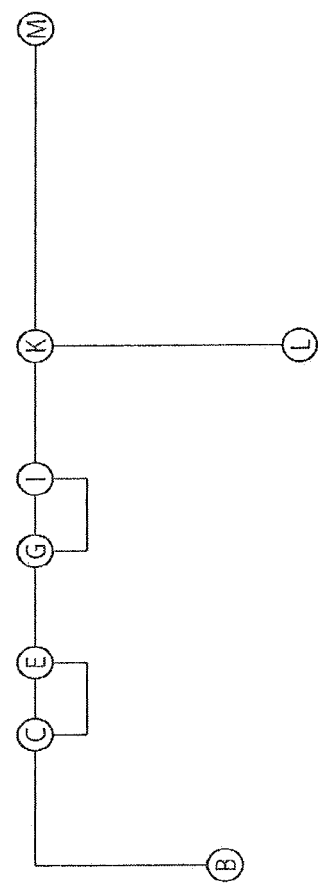
FIGS. 5A and 5B show a diagram illustrating another example of the traveling network structure information.

FIGS. 5A and 5B illustrate another example of the traveling network structure information. FIG. 5A is a diagram in which part of nodes is omitted from the traveling network structure information in FIG. 4 and only specific nodes are left. The specific nodes are nodes in the designated area or near the designated area; a position where package is to be piled up or to be carried down and/or a waiting position.

FIG. 5B illustrates traveling IDs of the respective traveling paths, IDs of nodes at both ends of the traveling paths, and standard time s required for traveling on the respective traveling paths. For example, a traveling ID of the traveling path between the nodes B and C is 1, nodes at both ends of the traveling path are B and C, and a standard time required for traveling on the traveling path is 180. Any time unit may be used.

The route planner 109 generates a route plan designating passing order of a plurality of designated areas which each mobile object passes through on the basis of content of work to be done by each mobile object determined in advance and information regarding order of the work, and stores data of the generated route plan in the route plan storage 102. While an arbitrary generation method of a route plan may be employed, as an example, a route plan of each mobile object may be generated so as to reduce a traveling distance in which a plurality of mobile objects travel in reverse directions on the same traveling path, as an evaluation criterion or part of the evaluation criterion as possible. The route plan may be generated by an external device or the user. In this case, the route planner 109 receives the route plan and stores the route plan in the route plan storage 102. The route planner 109 may receive data of the route plan from the external device via the communicator 110. The route planner 109 may acquire data of the route plan via an input device operated by the user.

The route plan storage 102 stores data of the route plan of each mobile object inside.

FIG. 6A illustrates an example of the route plan of a certain mobile object. In this example, the mobile object departs from a designated area L in FIG. 4A, goes to a designated area B by way of K, I, G, E, C and A, and, then, goes to a designated area M by way of A, C, D, F, E, G, H, J, I and K, goes to the designated area B again by way of K, I, G, E, C and A, and, further returns to the designated area L by way of A, C, D, F, E, G, H, J, I and K. Here, for convenience sake, the designated areas are expressed using IDs of the nodes. In a case where a node corresponds to the intersection portion, a designated area using an ID of the node is internally interpreted as expressing an end portion of a traveling path (before entering the intersection portion) connected to the intersection portion indicated by the node. For example, a designated area K which is the next designated area of the designated area L is interpreted as indicating an end portion of a traveling path LK immediately before entering the intersection portion indicated by the node K. Here, the traveling path LK is a traveling path between the node L and the node K. While the designated areas will be indicated using the node IDs also in the following description, it is assumed that the designated areas are indicated in a similar manner to that described here.

The traveling paths in the above-described example include a looped path which goes back and forth in the designated area. This route plan is directed to one mobile object, and route plans are also prepared for other respective mobile objects. Note that the traveling path does not have to be a looped path. The respective mobile objects may travel on different traveling paths over a long period.

In a case of a mobile object directed to conveyance of package, a mobile robot which does various kinds of work while moving, or the like, information of the work may be added to the route plan for the designated area in which work is to be done.

FIG. 6B illustrates an example of the route plan in this case. In this example, information (Load) which gives an instruction to do work of loading package from a shelf in the designated areas L and M and information (Unload) which gives an instruction to do work of unloading package in the designated area B are inserted. Here, Load indicates package loading work, and Unload indicates package unloading work. Note that a direction of work (piling up etc.) to be done for a shelf being working target may be determined in advance or may be automatically detected by the mobile object using a sensor, or the like. The examples of the direction of work include a left direction, a right direction, an anterior direction and an oblique direction.

The state storage 104 stores information indicating traveling states of the respective mobile objects and specific information of the mobile objects inside.

The information indicating the traveling states of the mobile objects may include position information of the respective mobile objects, remaining battery levels of batteries mounted on the mobile objects, whether or not the mobile objects have package (in a case where the mobile objects convey package), types and the number of pieces of package which are being conveyed, or the like. The position information includes current positions (positions which are detected most recently) of the mobile objects, and history information of positions which the respective mobile objects have passed through until now. The information indicating the traveling states is acquired by a state detector 202 (which will be described later) of the travel management device 200 as will be described later.

The specific information of the mobile objects may include, for example, specification information of the mobile objects, such as standard speed, maximum speed, minimum speed, sizes of the mobile objects and directions in which the mobile objects can move. Further, the information may include a change rate of the standard speed in accordance with the remaining battery levels (for example, as the remaining battery level is lower, the standard speed is set lower). Still further, if the mobile objects are directed to conveyance of package, the information may include information of length of a working period required for carrying down package (for example, a length of period required for piling up or carrying down a predetermined number of pieces of package). The information described here is merely an example, and the information may include other information.

The travel timing scheduler 105 generates a travel timing schedule so that conflict (a collision or deadlock) does not occur for each mobile object which is a planning target under constraint conditions that the route plan of each mobile object is not changed. The travel timing schedule includes information for specifying arrival time or departure time for each designated area as an example. There are, for example, time of arrival at the designated area, time of departure from the designated area, a length of a period spent (i.e., staying) in the designated area, a length of period for moving between the designated areas, or the like.

The mobile objects which become targets of planning of the travel timing schedules are all the mobile objects whose operation is managed by the travel management device 200 as an example. The travel timing scheduler 105 uses a route plan of each mobile object and information of each mobile object to generate the travel timing schedule of each mobile object. The information of each mobile object includes information indicating the traveling state and specific information as described before.

The travel timing scheduler 105 regenerates a travel timing schedule of each mobile object in a case where it is determined to regenerate a travel timing schedule by the replan determiner 108 which will be described later. The travel timing schedules generated previously are updated with the regenerated travel timing schedules. Regeneration of the travel timing schedules is performed for traveling paths (route portions) in which the mobile objects have not moved yet among traveling paths indicated in the route plans of the mobile objects. That is, the regeneration of the travel timing schedules is performed, among the traveling paths of the mobile objects, for traveling paths after update positions in the routes of the mobile objects as be described later.

FIG. 7 illustrates an example of the travel timing schedules generated by the travel timing scheduler 105. An example of the travel timing schedules for three mobile objects (AGV 0, AGV 1 and AGV 2) is indicated.

"MOVE" is a command (move command) for giving an instruction to move, and has a movement period length as an argument. For example, in the travel timing schedule for the AGV 0, MOVE-K-I-37.0 indicates movement from the designated area K (end portion of the traveling path LK leading to the intersection portion indicated by the node K) to the designated area I (end portion of the traveling path KI leading to the intersection portion indicated by the node I) in 37 time units. 37 time units is a movement period length designated as an argument.

"WAIT" is a command (wait command) for giving an instruction to wait in the designated area (before the node) of the movement destination. For example, in a case where a command of MOVE-I-G-10.0 is continuous with a command of WAIT-52.0, the commands indicate waiting for 52 time units in the designated area G (before the node G) when the mobile object moves from the designated area I to the designated area G. Therefore, in this case, the mobile object moves to the designated area G in 10 time units with MOVE-I-G-10.0, waits for 52 time units and moves in accordance with the next command (enters the intersection portion indicated by the node G and further enters the next traveling path). The waiting position may not be a designated area. The waiting position only has to be a position distant from the intersection portion.

In the present example, in the route plan of the mobile object AGV 0, a route (traveling paths) is designated in which the mobile object departs from the designated area L in FIG. 4A, goes to the designated area B by way of other designated areas, and, then, goes to M by way of other designated areas, goes to B again by way of other designated areas and returns to L by way of other designated areas.

In the route plan of the mobile object AGV 1, a route (traveling paths) is designated in which the mobile object repeats twice departing from the designated area B in FIG. 4A, going to the designated area M by way of other designated areas, and returning to the designated area B again by way of other designated areas.

In the route plan of the mobile object AGV 2, a route (traveling paths) is designated in which the mobile object departs from the designated area K in FIG. 4A, goes to the designated area B by way of other designated areas, goes to B again by way of other designated areas including the designated area L and returns to the designated area K by way of other designated areas.

The travel timing scheduler 105 generates the traveling timing schedules for the AGV 0, the AGV 1 and the AGV 2 as illustrated in FIG. 7 by executing search algorithm which will be described later under conditions that these route plans (see FIG. 6) of the AGV 0, the AGV 1 and the AGV 2 are provided. In these traveling timing schedules, for example, adjustment of time such arrival time, departure time, or the like, of the AGV 0, the AGV 1 and the AGV 2 for each designated area is performed so as not to cause conflict (such as a collision and deadlock). The example of the adjustment includes time adjustment by which the mobile object is caused to wait before the intersection portion until another mobile object passes through the intersection portion are adjusted.

The travel timing scheduler 105 may assume that the mobile objects move at the standard speed for each traveling path in the traveling network structure information in FIG. 4 in order to calculate a movement period length designated as the argument in the MOVE command. A standard period length for the traveling path may be provided in advance as in the traveling network structure information in FIG. 5 in view of a case where speed of the mobile object changes from the standard speed in accordance with a curvature, inclination, or the like, of the traveling path. In this case, the mobile objects may autonomously control movement speed between maximum speed and minimum speed so as to be able to move in the standard period. Further, there can be a case where the standard speed may be corrected by change rates provided in accordance with the remaining battery levels. Still further, if the mobile objects are directed to conveyance of package, the standard speed may be corrected to faster or slower while the mobile objects convey package. Further, the standard period length during which the mobile objects travel on each traveling path may be corrected on the basis of traveling result data. The travel timing scheduler 105 calculates a movement period length so as to satisfy conditions regarding speed as stated in the above.

The travel timing scheduler 105 generates traveling timing schedules while reflecting information of a working period length required for carrying down package for mobile objects which are directed to conveyance of package or mobile robots which do various kinds of work including carrying down of package. As indicated in the above-described route plan (see FIG. 6B), content of work to be done in the designated area may be designated. Further, content of work to be done by the mobile objects in the designated area may be determined in advance in accordance with pairs of the designated areas and types of mobile objects.

In the example of the traveling timing schedules illustrated in FIG. 7, it is assumed that it takes 40 time units to pile up package in the designated areas M and L, and it takes 130 time units to carry down package in the designated area B. Values depending on types and the number of pieces of package, or types of mobile objects are provided in advance as working period lengths for piling up and carrying down of package. These values may be stored in the state storage 104 or may be provided to the route plans. Further, the working period lengths may be corrected on the basis of the traveling result data. A command which instructs the mobile objects to do the wok may be provided in the traveling timing schedules for the designated area where the work is to be done. Alternatively, such an instruction command may be embedded in advance as a program code inside the mobile objects.

While a format of the traveling timing schedules illustrated in FIG. 7 is a format in which commands for the mobile objects are lined up, the format is merely an example. A format of the traveling timing schedules is not particularly limited. The traveling timing schedules only have to include information from which time at which the mobile objects should arrive and time at which the mobile objects should depart can be specified for part of the designated areas or all the designated areas in the route plans of the respective mobile objects.

The travel timing scheduler 105 generates a travel plan of each mobile object on the basis of the travel timing schedule of each mobile object and the route plan of each mobile object. Specifically, the travel timing scheduler 105 generates a travel plan of each mobile object by setting, for part or all of the designated areas in the route plan of the mobile object, information from which time at which the mobile object should arrive and time at which the mobile object should depart can be specified.

The travel plan storage 103 stores the travel plans of the respective mobile objects generated by the travel timing scheduler 105.

FIG. 8 illustrates part of a travel plan of the mobile object (AGV 0) in FIG. 7. Time information of the travel timing schedule of the AGV 0 in FIG. 7 is provided to the route plan in FIG. 6. The AGV 0 departs from the designated area L at time 0, arrives at the designated area K at time 70, departs without stopping (that is, passing through the designated area K at time 70), passes through the designated area I at time 107, arrives at the designated area G at time 117, waits there in 52 time units, and departs at time 169. A format of the travel plan illustrated in FIG. 8 is merely an example, and the format is not particularly limited. For example, the travel plan may be a plan in which the travel timing schedule is merely associated with the route plan.

The commander 107 transmits movement command data based on the travel timing schedule of each mobile object determined by the travel timing scheduler 105 to the travel management device 200 via the communicator 110. The travel management device 200 receives the movement command data of each mobile object from the communicator 110 of the travel planning device 100 via the communicator 201 and transmits the movement command data to each mobile object.

A first example of a form of the movement command data to be transmitted to each mobile object is a form which indicates information from which arrival time and departure time for part or all of the designated areas on the route plan of each mobile object can be specified. For example, in a case of the travel timing schedule in FIG. 7, because the plan itself is a command sequence, this may be used as is as the movement command data. Alternatively, in a case where a timing schedule having a format different from that in FIG. 7 is generated, a command sequence which can be interpreted by the mobile object may be generated from the travel timing schedule, and this command sequence may be used as the movement command data.

A second example of a form of the movement command data is a form which indicates information corresponding to a movement period length of each traveling path and a waiting period length (waiting in the designated area).

In either of the above-described two examples, each mobile object controls traveling by itself in accordance with the movement command data. The travel management device 200 may sequentially repeat to transmit a command which instructs each mobile object to depart from the designated area in which the mobile object waits, and a command which designates the designated area in which the mobile object should stop for waiting next, to each mobile object, on the basis of each piece of movement command data. In this case, each mobile object sequentially repeats reception of commands from the travel management device 200 as the movement command data and execution of the commands.

As a third example of the form of the movement command data, an intersection portion through which a plurality of mobile objects pass on the route plan may be specified from the travel timing schedules, and order in which the respective mobile objects pass through the intersection portion may be instructed to each mobile object. In this case, the intersection portion may be set as the designated area, and order in which the mobile objects pass through the designated area may be designated. By causing each mobile object to strictly meet the passing order, even if actual arrival time is shifted before and behind from the arrival time at each designated area in the travel timing schedule, it is possible to ensure that conflict such as a collision and deadlock does not occur. Note that the passing order of the respective mobile objects for the designated area can be calculated by the traveling timing schedules of the respective mobile objects being compared.

An example of commands which instruct order in which the respective mobile objects pass through (arrive at) the designated area (described as the designated area Ka) set at the intersection portion indicated by the node K and time (elapsed time length) will be described below on the basis of the traveling timing schedules of the respective mobile objects (AGV 0, AGV 1 and AGV 2) in FIG. 7.

AGV 2 0
AGV 0 70
AGV 1 205
AGV 1 453
AGV 2 593
AGV 2 773
AGV 0 920
AGV 0 1168
AGV 1 1218
AGV 1 1466
AGV 2 1606
AGV 0 1925

In the above-described example, the AGV 2 passes through the designated area Ka first (at a time point of time 0), then, the AGV 0 passes at a time point of time 70, and then, the AGV 1 passes at a time point of time 205. Interpretation will be possible in a similar manner in the following description.

As an example of a control method of the passing order of the designated areas, there is a method in which the travel management device 200 manages execution of the movement commands. The travel management device 200 includes a controller which manages execution of the movement command data (execution of the command). For example, the travel management device 200 causes the AGV 0 to wait at a position before the designated area or distant from the designated area until the AGV 2 passes in a case where the AGV 0 may first arrive at the designated area through which the AGV 2 is required to pass first. Alternatively, the travel management device 200 adjusts speed of the AGV 0 to delay arrival time (passing time) of the AGV 0 at the designated area. The control is performed by a wait command or a speed adjustment command (for example, a speed reduction command) being transmitted to the mobile object.

As another example of the control method, the travel management device 200 detects and stores identification information (ID) of the mobile object which passes through the designated area last via the state detector 202, and transmits the ID to other mobile objects. Each mobile object checks whether another mobile object which should pass before the mobile object has passed through the designated area on the basis of the ID received from the travel management device 200. For example, in a case of
AGV 0 70
AGV 1 205
AGV 1 453
in the above-described example of the command, the AGV 1 first confirms whether or not the AGV 0 has passed first before the AGV 1 passes through the designated area Ka on the basis of the ID received from the travel management device 200, and, after the AGV 1 has confirmed that the AGV 0 has passed first, the AGV 1 passes through the designated area Ka. Further, thereafter, after the AGV 1 confirms that the mobile object which has passed through the designated area Ka immediately before (last) is the AGV 1 itself, AGV 1 passes through the designated area Ka again.

The replan determiner 108 compares the travel plan stored in the travel plan storage 103 with the traveling state of the mobile object detected by the state detector 202, and determines whether or not to perform replan. Replan means update of the travel plan, that is, update of at least timing schedule among the route plan and the travel timing schedule. In a case where it is judged by the replan determiner 108 that the travel plan cannot be met by at least one mobile object, a replan trigger is generated. Further, also in a case where replan becomes necessary by external factors such as occurrence of new work to be done and new package to be conveyed, a replan trigger is generated. All the mobile objects for which plans are to be made become targets of the replan. Examples where the travel plan cannot be met will be described below as a first example and a second example.

(First example) Time (estimated arrival time) at which each mobile object arrives at the designated area in the travel timing schedule of each mobile object or time (estimated departure time) at which each mobile object departs is compared with the traveling state of each mobile object. The traveling state includes, for example, a current position of the mobile object and a designated area through which the mobile object passes last or from which the mobile object departs last. Then, at a time point at which it is determined that the mobile object cannot arrive by the estimated arrival time or the mobile object will be delayed by equal to or longer than a threshold time length for the estimated arrival time, the replan trigger is generated. To make this judgment, various kinds of assumption may be placed such as assumption that the mobile object moves on the traveling path at maximum possible speed or assumption that the mobile object moves at standard speed.

(second example) order in which the respective mobile objects pass through the designated area in the traveling timing schedules of the respective mobile objects is compared with current positions of the respective mobile objects. Or, the order is compared with a designated area through which the mobile object has passed last or from which the mobile object departs. Then, at a time point at which it is determined that the mobile object which should precede in the passing order of the designated area in the travel timing schedule will be delayed by equal to or longer than a threshold time length from time of arrival (estimated arrival time), the replan trigger is generated. For example, in a case where the mobile object which should precede will be late for the estimated arrival time even if the mobile object moves on the traveling path at maximum speed, it can be judged that delay by equal to or longer than a threshold time length is determined. Note that the second example is the same as the first example because, if focus is attention on the mobile object which should precede, the replan trigger is generated as a result of delay of arrival at the designated area of the mobile object which should precede.

The update position determiner 106 determines a position (update position) for which the travel plan should be updated for each mobile object in a case where it is determined by the replan determiner 108 to perform replan. That is, the mobile object operates in accordance with the travel plan before update (timing schedule before update) until the mobile object reaches the update position, and, after the mobile object reaches the update position, operates in accordance with the updated travel plan (updated timing schedule).

The update position may be an arbitrary position if each mobile object can perform communication with the travel management device 200 in real time via the communicator 201. The arbitrary position includes, for example, a current position of the mobile object, or a position at time after a certain margin is added to the current position in view of a time length required for calculation.

If the mobile objects can perform communication with the travel management device 200 only via the communication device 501 disposed in the designated area or near the designated area, the designated area or a position near the designated area may be set as the update position. The communication device 501 may be disposed in midstream of the traveling path instead of being disposed in the designated area or near the designated area. The update position does not have to be the designated area or a position near the designated area if the position is within a range where communication with the communication device 501 is possible. In a case where there is a possibility that the mobile object may hinder traveling of another mobile object by stopping in midstream of the traveling path (for example, a possibility that the mobile object may collide with a mobile object which comes from behind), a position immediately before the intersection portion to which the mobile object currently heads may be as the update position. The position immediately before may be a designated area.

The route planner 109 generates a route plan starting from the update position of each mobile object for each mobile object in a case where it is determined by the replan determiner 108 to perform replan.

As an example, a plan for a route portion after the update position in the current route plan is set as is as the updated route plan. That is, a route plan portion on which the mobile object has not moved yet is specified among the route indicated in the route plan of the mobile object, and the specified portion is set as the updated route plan. That is, a plan for a portion after the update position in the current route plan is cut out as is, and sets as the updated route plan. For example, in the current route plan is a route plan in FIG. 6A, it is assumed that the current position of the mobile object is a designated area E (before the intersection portion indicated by the node E), and the next movement destination is a node C (before the intersection portion indicated by the node C). In this case, a route plan portion on which the mobile object has not moved (updated route plan) becomes as follows by removing first four nodes L, K, I and G in FIG. 6A. (Updated route plan)

E, C, A, B, A, C, D, F, E, G, H, 3, I, K, M, K, I, G, E, C, A, B, A, C, D, F, E, G, H, J, I, K, L, K, I, G, E,

Alternatively, as another example, in a case where it is determined by the replan determiner 108 to perform replan, the route planner 109 may generate a route plan of each mobile object on the basis of information of a current position of each mobile object or information of the update position of each mobile object. Here, the replan is perforemd so as to reduce a sum of distances of traveling paths (traveling sections) on which a plurality of mobile objects travel in reverse directions at the same time where the sum of distances is used as an evaluation criterion or part of the evaluation criterion.

Alternatively, as still another example, in a case where a plurality of options for the route plan which can be utilized are provided in advance in accordance with a current position of each mobile object and content of work to be done by each mobile object, one of the options may be selected on the basis of the update position of each mobile object and content of each remaining work. In addition, there is also a method in which a new route plan is generated using algorithm provided in advance. The update method of the route plan is not particularly limited here, and existing route planning methods may be used.

The travel timing scheduler 105 regenerates (updates) the travel timing schedule on the basis of the updated route plan for each mobile object. The travel timing scheduler 105 regenerates a travel plan by providing time information for each designated area in the updated timing schedule to the updated route plan. The travel timing scheduler 105 updates the travel plan in the travel plan storage 103 with the regenerated travel plan.

The commander 107 transmits the movement command data based on the updated timing schedule of each mobile object to the travel management device 200. The travel management device 200 transmits the movement command data to each mobile object when each mobile object exists at the update position.

The travel management device 200 manages execution for causing each mobile object to travel and manages the traveling state of each mobile object in accordance with the movement command data of each mobile object received from the travel planning device 100.

The communicator 201 of the travel management device 200 performs communication with the mobile objects 301_1 to 301_N and the travel planning device 100. Communication may be either wireless communication or wired communication.

The state detector 202 of the travel management device 200 acquires information indicating the traveling state of the mobile object using the communication device 501 or the sensor 401. The state detector 202 may acquire information indicating the traveling state of the mobile object using the communicator 201. The state detector 202 transmits information indicating the traveling state of each mobile object to the travel planning device 100 via the communicator 201. The information indicating the traveling state of each mobile object may include time at which the traveling state of each mobile object is detected.

The sensor 401 is a sensor for detecting a state of the mobile object. The communication device 501 is a device which performs wireless communication with the mobile object in a shorter distance than of wireless communication performed by the communicator 201. The sensor 401 and the communication device 501 are disposed at, for example, specific positions on any traveling paths where the mobile object is likely to temporarily stop. The specific positions are designated areas or portions near the designated areas as an example.

The sensor 401 is a traveling path side sensor such as a proximity sensor, a pressure sensor and a photoelectric sensor as an example. The sensor 401 detects arrival of the mobile object, passing, a direction, whether or not package is loaded, or the like, at the specific positions. The sensor 401 may be a camera provided on a ceiling of a facility. In this case, an image inside the facility is captured with the camera from a higher point of view from the ceiling. Further, the communication device 501 is a device which performs communication in a relatively short distance such as, for example, near field communication and infrared communication. The communication device 501 can perform wireless communication with the mobile object existing within a communication range.

The sensor 401 transmits a signal indicating information detected from the mobile object to the state detector 202. The communication device 501 transmits the information received from the mobile object to the state detector 202.

The state detector 202 specifies the traveling state of the mobile object on the basis of the information received from the sensor 401 or the communication device 501. In a case where the sensor 401 is a camera, the state detector 202 specifies a position of each mobile object on the basis of the captured image. By using the sensor 401 or the communication device 501, it is possible to detect the traveling state of the mobile object even when the mobile object exists at a position where the mobile object cannot perform communication with the communicator 201.

Examples of the traveling state of the mobile object may include a position of each mobile object (current position), time at which each mobile object passes through the designated area, a traveling direction of each mobile object, whether or not each mobile object has package (in a case where each mobile object conveys package), or the like.

In a case where the mobile object has a function of performing self-position estimation at the own device, the state detector 202 may acquire the position information estimated by the mobile object via the communicator 201 or the communication device 501. Examples of the self-position estimation may include estimation using means such as dead reckoning, SLAM and GPS.

Further, markers for position detection such as wireless tags and barcodes may be provided at specific positions where the mobile objects are likely to pass. The specific positions are designated areas or positions near the designated areas as an example. In this case, by the mobile objects detecting the markers, the mobile objects themselves can detect arrival at or passing through the positions. The mobile objects transmit the detected information to the travel management device 200 via the communicator 201 or the communication device 501.

Each mobile object 301 receives the movement command data from the travel management device 200 and autonomously travels on the traveling paths in accordance with the movement command data. As means for autonomous traveling, for example, as illustrated in FIG. 2 described above, there is means in which guide tapes are pasted on floor in advance, and the mobile objects travel along the guide tapes. As another means, there is means in which traveling in a certain distance is repeated using dead reckoning while positions are corrected with markers, or means in which the mobile objects autonomously travel between designated areas using SLAM (Simultaneous Localization And Mapping), or the like.

Figure 9:
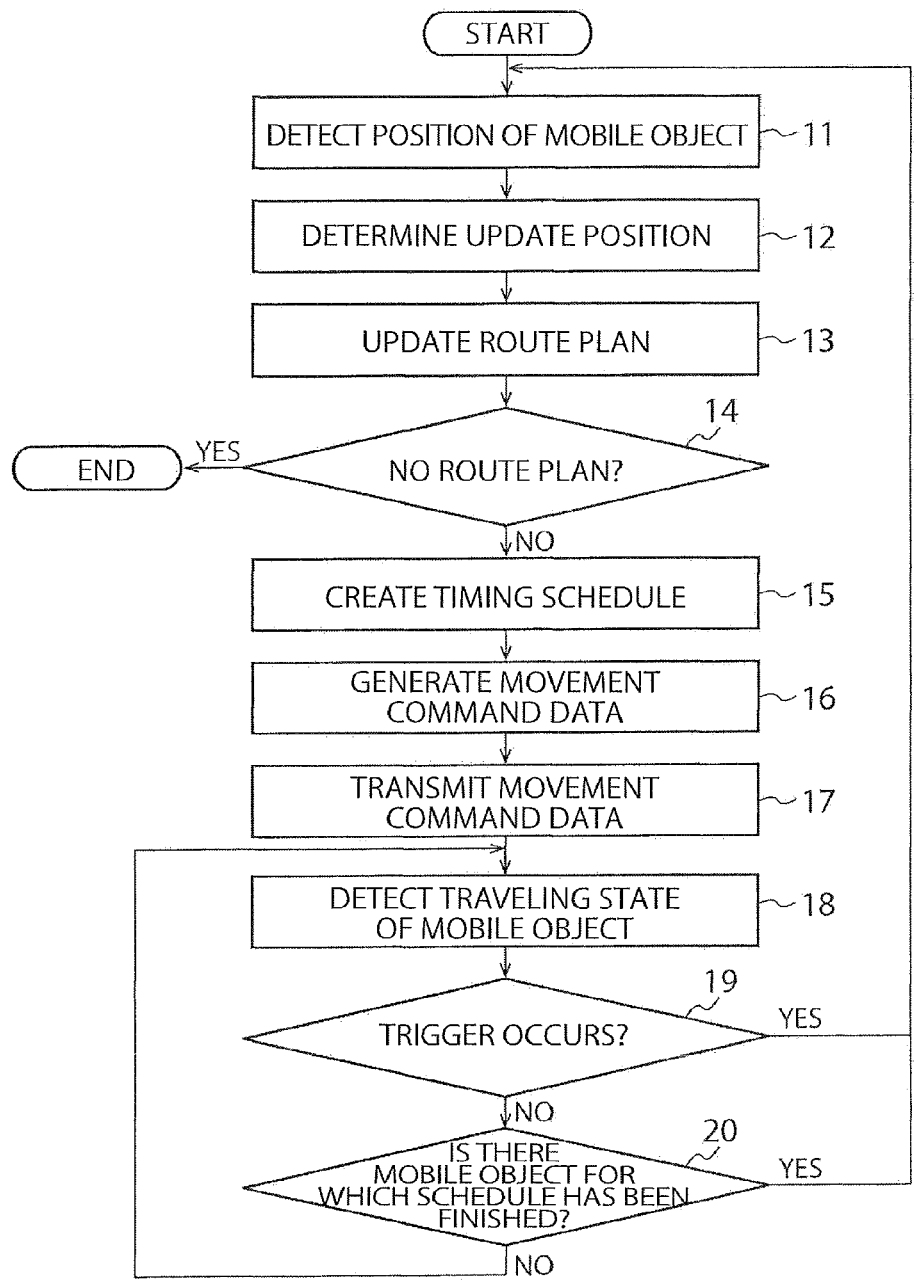
FIG. 9 is a diagram illustrating a flowchart of processing of the travel planning system.

FIG. 9 is a flowchart of overall operation of the travel planning system 1. It is assumed that the route plan of each mobile object is provided in advance, the travel timing schedule is generated by the travel timing scheduler 105, and the travel plan in which the time information of the travel timing schedule is provided to the route plan is generated. It is assumed that each mobile object operates on the basis of the movement command data based on the travel timing schedule. Note that supplementary explanation of operation upon start of operation of the travel planning system 1 (the travel timing schedule has not been created yet, and each mobile object stops at an initial position) will be provided as appropriate.

The state detector 202 of the travel management device 200 detects a position and a traveling direction of each mobile object (step 11). Note that, upon start of operation of the travel planning system 1, it is only necessary to detect an initial position and a direction of each mobile object. Note that, in a case of a mobile object which can turn at the place and can move in all directions, there can be a case where a traveling direction is not detected.

The update position determiner 106 determines a position (update position) at which the travel plan of each mobile object is updated on the basis of a current travel plan of each mobile object (step 12). Note that, upon start of operation of the travel planning system 1, because the travel plan of each mobile object has not been generated yet, it is only necessary to set an initial position of each mobile object as the update position.

The route planner 109 generates the route plan starting from the update position for each mobile object or extracts part of the route plan prepared in advance. The previous route plan is updated with the generated or extracted route plan (step 13). Note that, upon start of operation of the travel planning system 1, it is only necessary to generate the route plan starting from the initial position of each mobile object or acquire the route plan from outside.

In a case where the route plans are not generated for all the mobile objects (step 14: Yes), processing of the present flowchart is finished. For example, in a case where there is no package to be transported, no work to be done, or the like, the route plan is not generated for the mobile object. The present processing may be finished if update of the travel timing schedule does not finish in time (for example, there is a possibility that current operation of all the mobile objects will finish before the travel timing schedule is updated). Alternatively, the present processing may be finished also in a case where it is determined that the route plan cannot be generated.

In a case where the route plan is updated (regenerated) for at least one mobile object (step 14: No), the travel timing scheduler 105 generates the travel timing schedule of each mobile object on the basis of the updated route plan of the mobile object (step 15). The travel timing scheduler 105 generates the travel plans by providing time information indicated in the travel timing schedules to the route plans. Note that, for the mobile object (for example, the mobile object whose operation has been completed) for which the route plan does not exist, the travel timing schedule is not generated. Note that, upon start of operation of the travel planning system 1, because the route plans for all the mobile objects exist, traveling timing schedules for all these mobile objects are generated.

The commander 107 generates the movement command data for each mobile object on the basis of the travel timing schedule of each mobile object (step 16) and transmits the movement command data of each mobile object to the travel management device 200.

The travel management device 200 transmits the movement command data to each mobile object using the communicator 201 (step 17).

The state detector 202 of the travel management device 200 monitors the traveling state of each mobile object in real time via at least one of the communicator 201, the sensor 401 and the communication device 501 (step 18). The state detector 202 transmits information indicating the traveling state of each mobile object to the replan determiner 108 via the communicator 201 (also step 18).

The replan determiner 108 judges whether there exists at least one mobile object which cannot meet the travel plan (or the travel timing schedule) or judges whether or not replan is required due to external factors such as occurrence of new work on the basis of the travel plan of each mobile object and the traveling state of each mobile object (step 19). The replan determiner 108 generates a replan trigger in a case where it is determined to perform replan (step 19: Yes).

In a case where the replan trigger is generated (step 19: Yes), the processing returns to step 11. Then, the route plans and the traveling timing schedules of all the mobile objects (except the mobile object for which execution of the plan has already been finished) are updated (step 11 to step 15). Then, the movement command data based on the updated timing schedule is transmitted to each mobile object again. Note that each mobile object updates the movement command data received previously with the received movement command data.

In a case where a replan trigger is not generated (step 19: No), it is judged whether there exists a mobile object for which the travel plan (or the travel timing schedule) has been finished. In a case where the travel plan has been finished (step 20: Yes) for at least one mobile object, the processing returns to step 11. Then, the route plans and the traveling timing schedules of the mobile objects are updated (step 11 to step 15), the movement command data based on the updated timing schedule is retransmitted to each mobile object. In a case where there exists no mobile object for which the travel plan has been finished, the processing returns to step 18. The processing from step 18 to step 20 is repeated until the replan trigger is generated or until the mobile object for which the travel plan has been finished appears.

Details of step 15 in FIG. 9 will be described using FIG. 10, FIG. 11 and FIG. 12. In the present step, even in a case where the mobile objects travel in reverse directions on the same traveling path in the respective route plans or there exist a plurality of mobile objects with different speeds, the traveling timing schedules which ensure that a collision or deadlock of the mobile objects does not occur are generated. In generation of the traveling timing schedules, preconditions are set such that the route plans of the respective mobile objects are not changed.

Figure 10:
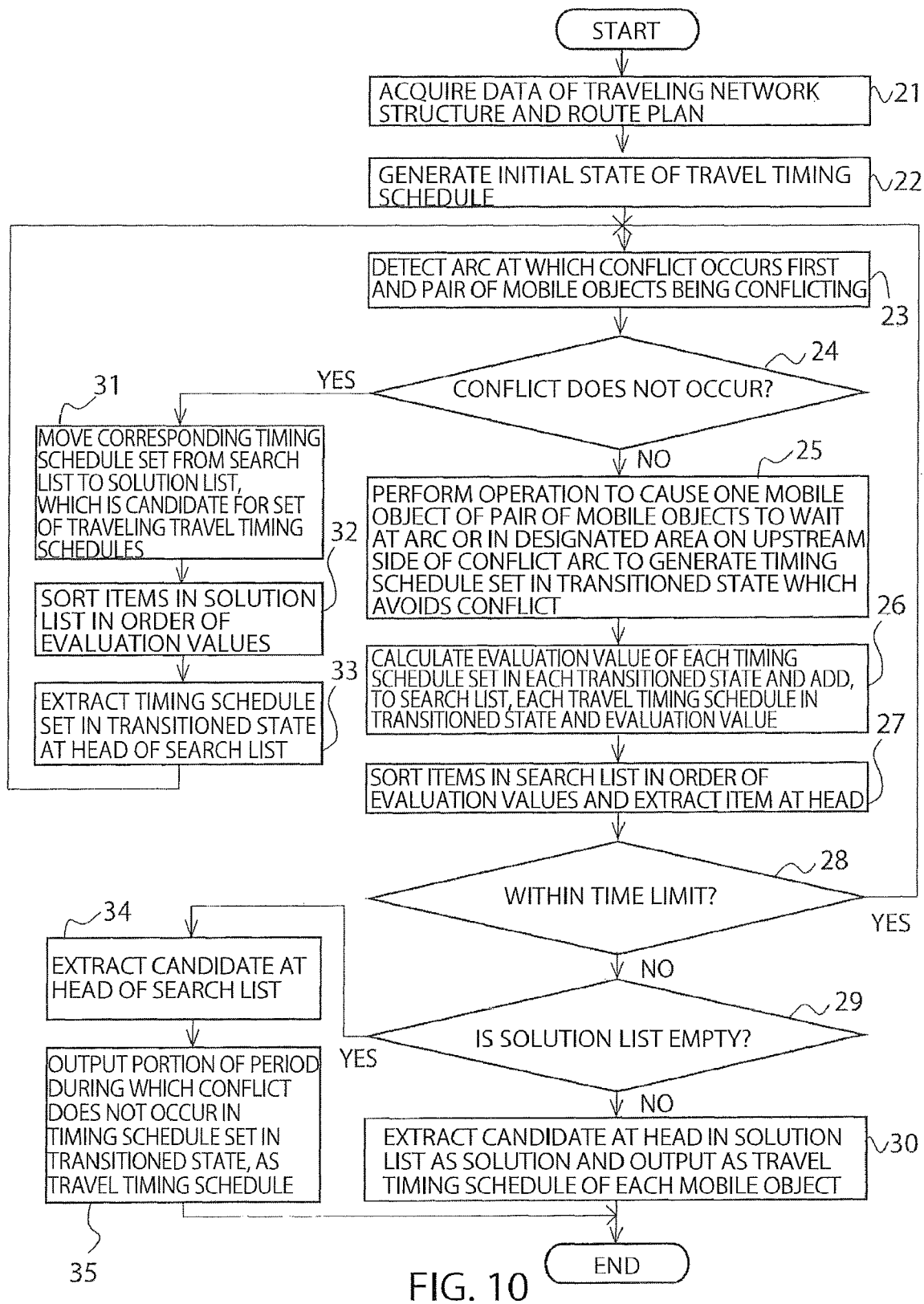
FIG. 10 is a diagram illustrating a flowchart of detailed processing of a travel timing schedule.

FIG. 10 is a flowchart of an example of processing by the travel timing scheduler 105.

The travel timing scheduler 105 acquires the traveling network structure information (see FIG. 4 or FIG. 5) from the traveling network structure storage 101 and acquires data of the route plans from the route plan storage 102 (step 21).

The travel timing scheduler 105 generates a timing schedule (timing schedule in an initial state) in which at least one of time at which each mobile object arrives at each designated area and time at which each mobile object departs from each designated area is specified on the basis of the traveling network structure information and the route plan of each mobile object, as an example (step 22). These timing schedules in the initial states of the mobile objects will be collectively referred to as "a timing schedule set in an initial state". As a generation method of a timing schedule in an initial state, information regarding at least one of arrival time and departure time at and from each designated area in the route plan is set for each mobile object using an arbitrary method. For example, time of arrival or departure at or from each designated area is calculated on the basis of standard speed of the mobile object and a period length required for work, and information of the calculated time is set. In a case where there is a condition (for example, a speed pattern) regarding speed at which the mobile objects travel on each traveling path, the timing schedule is generated so as to satisfy the condition regarding the speed. Alternatively, it is also possible to divert part (portion after the update position) of the travel timing schedule which has been generated previously without changing the part.

The travel timing scheduler 105 detects a pair of two mobile objects between which conflict (such as deadlock or a collision) will occur first in a time direction and an arc (traveling path) on which the conflict will occur, on the basis of the timing schedule set in the initial state (detection processing) (step 23). As an example, time at which conflict will occur first is specified for each of all combinations of two timing schedules in the timing schedule set in the initial state. Time which is temporally earliest among the specified time is selected. A pair of two mobile objects between which conflict will occur at the selected time is detected, and an arc (traveling path) on which the conflict will occur are also detected.

Figures 11A, 11B, 11C:
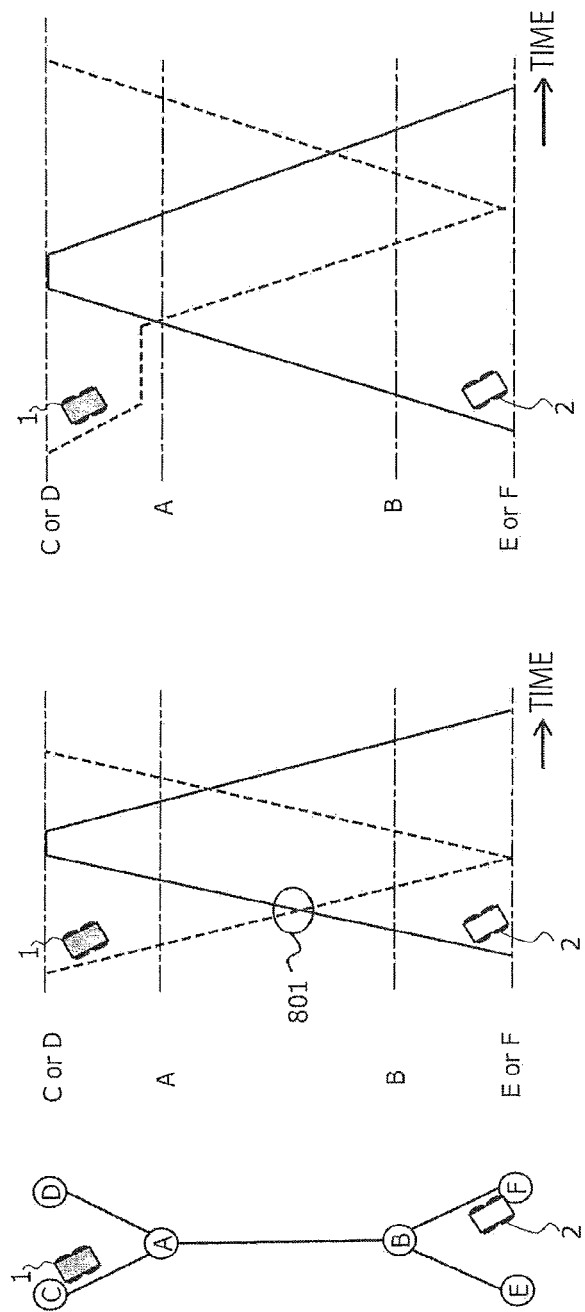
FIGS. 11A to 11C show a diagram illustrating an example of conflict check and avoidance processing.

FIG. 11A is a diagram for explaining an example where conflict will occur in a case where two mobile objects (indicated as a mobile object 1 and a mobile object 2) travel in a travel network with a simple structure. It is assumed here that the route plane of the mobile object 1 and the route plan of the mobile object 2 defines that the mobile object 1 travels back and forth between the node C and the node E, and the mobile object 2 travels back and forth between the node F and the node D.

Here, on the traveling path (section AB) between the node A and the node B, the mobile object 1 and the mobile object 2 travel in directions reverse to each other. If the mobile object 1 and the mobile object 2 keep traveling as it is, in a case where the mobile object 1 and the mobile object 2 cannot travel backward on the traveling path, deadlock occurs. Even if at least one of the mobile object 1 and the mobile object 2 can travel backward, efficiency drastically degrades due to stop and backward traveling for avoiding a collision.

FIG. 11B is a graph indicating movement trajectories of the mobile object 1 and the mobile object 2 over time on the basis of the timing schedules in the initial states of the mobile object 1 and the mobile object 2. A graph with a dashed line is a graph for the mobile object 1, and a graph with a solid line is a graph for the mobile object 2. Whether or not there occurs conflict can be detected by checking intersections of the movement trajectories for each traveling path (section). In this example, the movement trajectories of the mobile object 1 and the mobile object 2 intersect at a point 801 in the section AB. Therefore, it is possible to detect occurrence of conflict between the mobile object 1 and the mobile object 2 in the section AB.

FIG. 12A is a diagram for explaining another example where conflict (collision) occurs in a case where two mobile objects (indicated as a mobile object 1 and a mobile object 2) travel. It is assumed here that the route plan of the mobile object 1 and the route plan of the mobile object 2 defines that the mobile object 1 travels back and forth between the node E and the node C, and the mobile object 2 travels back and forth between the node F and the node D.

The mobile object 1 and the mobile object 2 travel in the same direction in the section AB. Because the section AB has a traveling network structure in which passing is impossible, in a case where movement speed of the mobile object 1 is different from movement speed of the mobile object 2, a rear-end collision or temporary stop can occur in the section AB. As a result of temporary stop and re-traveling for preventing a rear-end collision being repeated, traveling efficiency may degrade.

FIG. 12B is a graph illustrating the movement trajectories of the mobile object 1 and the mobile object 2 over time on the basis of the timing schedules (initial states) of the mobile object 1 and the mobile object 2. A graph with a dashed line is a graph for the mobile object 1, and a graph with a solid line is a graph for the mobile object 2. While the mobile object 2 departs behind the mobile object 1, because the speed of the mobile object 2 is faster than the speed of the mobile object 1, the mobile object 2 collides with the mobile object 1 from behind. The movement trajectory of the mobile object 1 intersects with the movement trajectory of the mobile object 2 at a point 802, and the mobile object 1 collides with the mobile object 2 at a position corresponding to the point 802. In this manner, it is possible to detect occurrence of conflict between the mobile object 1 and the mobile object 2 in the section AB.

In a case where a pair of mobile objects between which conflict may occur can be detected in step 23 (step 24: No), a plurality of measures or at least one measure for avoiding the conflict is determined for an arc (conflict arc) in which the conflict will occur. For example, it is possible to avoid the corresponding conflict by performing operation of causing the mobile object of one of the mobile objects in the pair to wait in an arc (traveling path) or at a designated area on an upstream side of the conflict arc. In this case, it can be said that there are two measures. Therefore, the timing schedule set is updated (update processing) so as to change at least one of the timing schedules of at least two mobile objects between which conflict will occur for each of the two measures (step 25).

It is assumed, for example, that a plurality of mobile objects 1 to H (H is an integer of equal to or greater than 2) exist. In a case where the mobile object 1 conflicts with the mobile object 2, there are two measures: a measure in which the mobile object 1 is caused to wait, and a measure in which the mobile object 2 is caused to wait. In this case, for the set of timing schedules of the mobile objects 1 to H, the set is updated by changing at least one of the timing schedules of at least the mobile object 1 and the mobile object 2 for each of the two measures. Thereby, two updated sets can be obtained from one set.

The updated timing schedule set(s) each will be referred to as "a timing schedule set in a transitioned state". The timing schedule set before update is stored.

FIG. 11C illustrates an operation example of conflict avoidance in step 25. FIG. 11C illustrates an example where conflict is avoided by the mobile object 1 waiting in an arc CA which is on an upstream side of an arc (traveling path) AB or adjusting (reducing) speed in order to avoid conflict at the point 801 detected in FIG. 11B. As another method for avoiding the conflict detected in FIG. 11B, it is also possible to employ a method in which the mobile object 2 waits on a traveling path FB which is on an upstream side of the traveling path BA or adjusts (reduces) speed. As a result of such operation for conflict avoidance being performed, the movement trajectory of the mobile object 1 does not intersect with the movement trajectory of the mobile object 2 on the traveling path AB. Therefore, conflict is avoided.

FIG. 12C and FIG. 12D illustrate another operation example of conflict avoidance in step 25. FIG. 12C illustrates an example where conflict is avoided by the mobile object 1 waiting on a traveling path EB which is on an upstream side of the traveling path BA in order to avoid conflict at the point 802 detected in FIG. 12B. The mobile object 1 is caused to pass through the traveling path BA, for example, after the mobile object 2 arrives at the designated area A or passes through the intersection portion corresponding to the node A. In a similar manner, FIG. 12D illustrates an example where conflict is avoided by the mobile object 2 waiting on the traveling path FB which is on an upstream side of the BA. The mobile object 2 is caused to pass through the traveling path BA, for example, after the mobile object 1 arrives at the designated area A or passes through the intersection portion corresponding to the node A.

The travel timing scheduler 105 calculates an evaluation value for each generated timing schedule set in the transitioned state (calculation processing). The travel timing scheduler 105 adds each generated timing schedule set and each evaluation value which are associated with each other, to a search list (step 26). The search list is a list in which a plurality of timing schedule sets which are being processed are temporarily stored.

Here, a calculation example of the evaluation value of the timing schedule is described. Traveling period lengths of traveling paths traveled by each mobile object in a case where each mobile object travels on respective traveling paths without time for conflict being adjusted (for example, traveling period lengths in a case where each mobile object travels on the traveling paths (the route) in accordance with a timing schedule in an initial state) are calculated as reference values of the traveling paths of each mobile object. For the reference values, a sum or a power sum of delay times due to adjustment of time is calculated for each mobile object, the calculated values for the mobile objects are added up. The added-up value is set as an evaluation value (penalty evaluation value). In this example, as the evaluation value is smaller, evaluation becomes higher. However, the evaluation value may be defined so that evaluation becomes higher as the evaluation value is greater. In this case, it is only necessary to define an inverse of the above-described added-up value as the evaluation value. The calculation method of the evaluation value will be described in detail later. The calculation method of the evaluation value is not limited to a particular method.

The travel timing scheduler 105 sorts the respective timing schedule sets in the transitioned states in the search list in descending order of the evaluation values (step 27). The travel timing scheduler 105 extracts a timing schedule set in a transitioned state at the head of the search list as a target to be searched next (also step 27). That is, one timing schedule set in a transitioned state is selected from the timing schedule sets in the transitioned states in the search list (selection processing).

The travel timing scheduler 105 judges whether the calculation period falls within a predetermined time limit or whether or not the number of times of repetition falls within a predetermined number of times (step 28). An arbitrary portion in the flowchart can be set as a target for judging the number of times of repetition. For example, the targeted portion may be processing from step 23 to 28. If the calculation period falls within the time limit or the number of times of repetition falls within the predetermined number of times (step 28: Yes), the processing returns to step 23. In step 23 returned, detection processing is continuously performed where the timing schedule in the transitioned state extracted in step 27 is newly regarded as a timing schedule in an initial state. The detection process includes detecting an arc at which conflict first occurs and a pair of mobile objects which conflict in the arc (conflict detected last time or before the last time has been solved).

In a case where conflict does not occur in the timing schedule set as a processing target in step 23 (step 24: Yes), the timing schedule set becomes a candidate for a travel timing schedule set to be output. Therefore, the corresponding timing schedule set in the transitioned state is moved to a solution list from the search list as the candidate for the travel timing schedule set along with the evaluation value (step 31). The solution list is a list in which candidates for the travel timing schedule set to be output are temporarily stored.

The travel timing scheduler 105 sorts items in the solution list in order of the evaluation values (step 32).

The travel timing scheduler 105 extracts the timing schedule set at the head of the search list as the next processing target (step 33), and the processing returns to step 23 while this timing schedule set is regarded as the timing schedule set in the initial state.

In a case where the calculation period exceeds the time limit or the number of times of repetition exceeds the predetermined number of times (step 28: No), the travel timing scheduler 105 checks whether the solution list includes at least one candidate for the travel timing schedule set (step 29). In a case where the solution list is not empty (step 29: No), a candidate for the travel timing schedule set at the head of the solution list is output as a solution. That is, the timing schedule of each mobile object included in the candidate is output as the travel timing schedule of each mobile object (step 30). Because items in the solution list are sorted in ascending order of the evaluation values (here, evaluation is higher as the evaluation value is smaller), the candidate at the head of the solution list is a timing schedule set with the highest evaluation.

Meanwhile, in a case where the solution list is empty (step 29: Yes), the travel timing scheduler 105 extracts the timing schedule set in the transitioned state at the head of the search list as a solution (step 34). A range of a period (a plan portion which is partially completed) in which conflict is solved in the timing schedule of each mobile object in the extracted solution is specified, and the plan portion of the specified range is output as the travel timing schedule of each mobile object (step 35).

Figure 13:
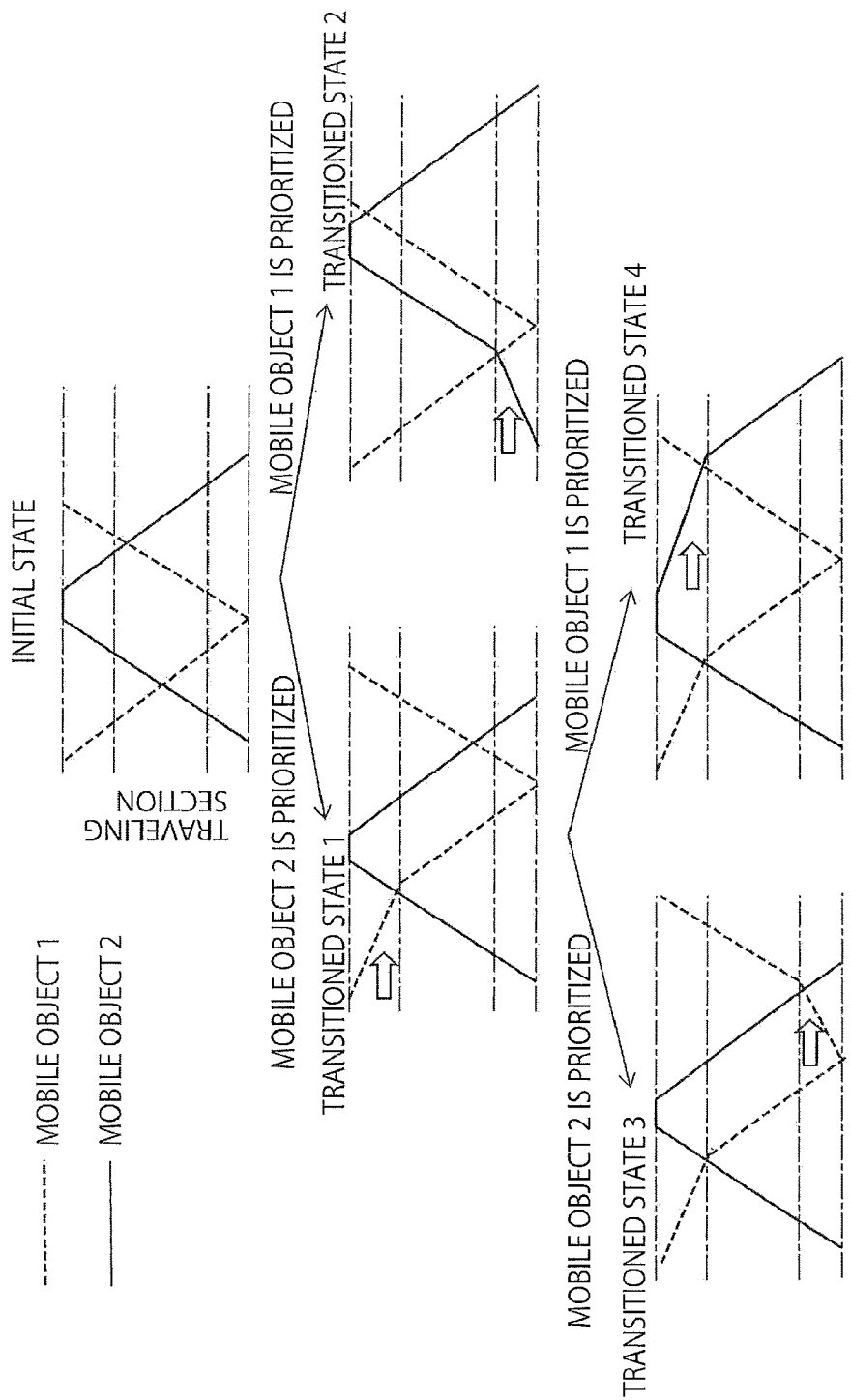
FIG. 13 is a conceptual diagram of search processing of a travel timing schedule.

FIG. 13 illustrates a conceptual diagram of search processing of the travel timing scheduler in the flowchart in FIG. 10. A top portion in FIG. 13 corresponds to the travel timing schedule illustrated in FIG. 11B (however, scale is changed).

There are two patterns of conflict avoidance measures for the traveling path (conflict arc) on which traveling in reverse directions will occur: a measure in which the mobile object 1 is caused to wait and a measure in which the mobile object 2 is caused to wait. Time at which conflict will occur next and the traveling path on which conflict will occur next change depending on which of the mobile objects is caused to wait to avoid conflict. In step 25 in FIG. 10, a timing schedule set in a transitioned state 1 can be obtained if operation of prioritizing the mobile object 2 (operation of causing the mobile object 1 to wait) is performed, and a timing schedule set in a transitioned state 2 can be obtained if operation of prioritizing the mobile object 1 (operation of causing the mobile object 2 to wait) is performed. Note that an outline arrow in the drawing indicates a changed portion in the graph.

The evaluation values are respectively calculated for the timing schedule set in the transitioned state 1 and the timing schedule set in the transitioned state 2, and the timing schedule set in the transitioned state 1 and the timing schedule set in the transitioned state 2 are stored in the search list along with the respective evaluation values (step 26 in FIG. 10). Items in the search list are sorted in ascending order of the evaluation values, and, because the evaluation value of the timing schedule set in the transitioned state 1 is smaller (evaluation is higher), the timing schedule set in the transitioned state 1 is selected (step 27 in FIG. 10).

Search recursively proceeds while the timing schedule set in the transitioned state 1 is regarded as the timing schedule set in the initial state (step 23 in FIG. 10), and the timing schedule set in the transitioned state 3 and the timing schedule set in the transitioned state 4 are obtained depending on which of the mobile object 2 and the mobile object 1 is prioritized. The evaluation values are respectively calculated for the timing schedule set in the transitioned state 3 and the timing schedule set in the transitioned state 4. The timing schedule set in the transitioned state 3 and the timing schedule set in the transitioned state 4 are stored in the search list along with the respective evaluation values (step 26 in FIG. 10).

In the search list, the timing schedule set in the transitioned state 2, the timing schedule set in the transitioned state 3, and the timing schedule set in the transitioned state 4 at this time point are stored along with the respective evaluation values. Among these, the timing schedule set with the smallest evaluation value (with high evaluation) is selected, and processing recursively proceeds while this is regarded as the timing schedule set in the initial state (step 23).

In this manner, in the search algorithm in FIG. 10, combinations of conflict avoidance measures are sequentially searched. If the number of mobile objects is large or the number of conflict arcs is large, the number of combinations of the conflict avoidance measures becomes enormous, which typically makes it difficult to generate plans in real time; however, in the search algorithm in FIG. 10, evaluation values of the timing schedule sets in the transitioned states are calculated, and search is preferentially performed from the timing schedule set with a smaller evaluation value (with higher evaluation). Therefore, it is possible to perform efficient search.

At this time, by applying a search method called heuristic optimal solution search algorithm ("A search"), it is possible to obtain a timing schedule with high evaluation in a short period of time. In the A search, for example, the evaluation value is calculated on the basis of a sum of delay times for traveling paths (searched paths) for which conflict has been solved in the target timing schedule set, and predicted values of delay times expected for remaining traveling paths (unsearched paths) after the searched paths.

Specifically, a sum of the remaining traveling distances in the route plans of the respective mobile objects is calculated for time after time at which conflict is avoided last in the timing schedule set. Predicted values of delay times in the remaining traveling are obtained through assumption that delays may occur at a fixed ratio depending on the remaining traveling distances. For example, traveling period lengths in a case where the mobile objects travel on the remaining traveling distances at standard speed are calculated, and values obtained by multiplying the traveling period lengths by a fixed coefficient are calculated as the delay times. A sum of the calculated delay times and a sum of delay times of the mobile objects before time at which the above-described conflict occurs are added up, and the added-up value is set as the evaluation value (in a case where evaluation is higher as the evaluation value is smaller). To make setting so that evaluation becomes higher as the evaluation value is greater, it is only necessary to define an inverse of the added-up value as the evaluation value.

As described above, according to the present embodiment, it is possible to efficiently make travel plans of a plurality of mobile objects while avoiding conflict such as deadlock and/or a collision. Further, even in a case where movement in both directions on the same traveling path must occur, it is possible to generate traveling timing schedules which ensure that a collision or deadlock does not occur. As an example of the case where movement in both directions on the same traveling path must occur, there is a case where the mobile objects travel on traveling paths of a tree structure shape, a case for a reason of safety, or the like.

(Hardware Configuration)

Figure 14:
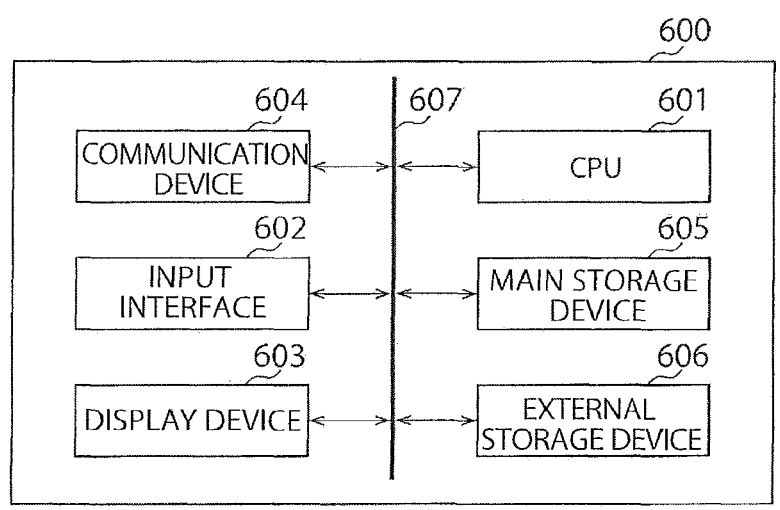
FIG. 14 is a hardware block diagram of a travel planning device.

FIG. 14 illustrates a hardware configuration of the travel planning device 100 according to any one of the first to third embodiments. The travel planning device 100 according to the present embodiment is configured with a computer device 600. The computer device 600 includes a CPU 601, an input interface 602, a display device 603, a communication device 604, a main storage device 605 and an external storage device 606, and these are connected to each other with a bus 607. The travel management device 200 can be also configured by the hardware configuration similar to that of FIG. 14.

The CPU (Central Processing Unit) 601 executes a computer program which realizes the above-described respective functional configurations of the travel planning device 100 on the main storage device 605. The computer program may be configured by not only a single program but also a plurality of programs, scripts or combinations thereof. By the CPU 601 executing the computer program, the respective functional configurations are realized.

The input interface 602 is a circuit for inputting an operation signal from the input device such as a keyboard, a mouse and a touch panel, to the travel planning device 100.

The display device 603 displays data or information output from the travel planning device 100. While the display device 603 is, for example, an LCD (Liquid Crystal Display), a CRT (Cathode-Ray Tube), and a PDP (Plasma Display Panel), the display device 603 is not limited to this. The data or the information output from the computer device 600 can be displayed by this display device 603.

The communication device 604 is a circuit for the travel planning device 101 to communicate with an external device in a wireless or wired manner. Information can be input from the external device via the communication device 604. Information input from the external device can be stored in a DB. A constitution for performing communication in the travel planning device can be constructed on the communication device 604.

The main storage device 605 stores a program which realizes processing of the present embodiment, data required for execution of the program, data generated by execution of the program, and the like. The program is developed and executed on the main storage device 605. While the main storage device 605 is, for example, a RAM, a DRAM and an SRAM, the main storage device 605 is not limited to this. The storage in each embodiment may be constructed on the main storage device 605.

The external storage device 606 stores the above-described program, data required for execution of the program, data generated by execution of the program, and the like. These kinds of program and data are read out to the main storage device 605 upon processing of the present embodiment. While the external storage device 606 is, for example, a hard disk, an optical disk, a flash memory and a magnetic tape, the external storage device 606 is not limited to this. The storage in each embodiment may be constructed on the external storage device 606.

Note that the above-described program may be installed in the computer device 600 in advance or may be stored in a storage medium such as a CD-ROM. Further, the program may be uploaded on the Internet.

Further, the travel planning device 100 may be configured with a single computer device 600 or may be configured as a system including a plurality of computer devices 100 which are connected to each other.

Second Embodiment

Figure 15:
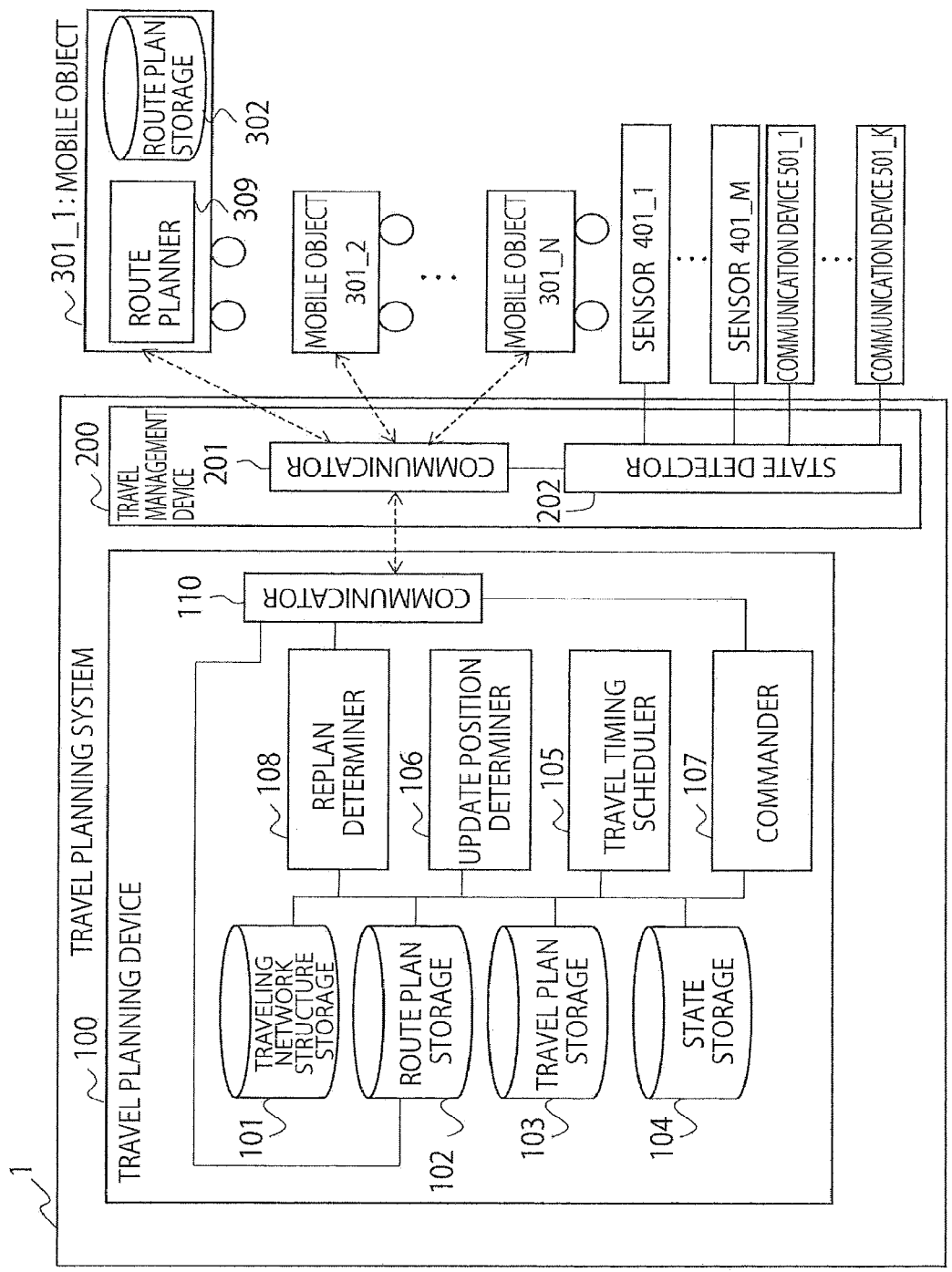
FIG. 15 is a diagram illustrating an example of an entire system configuration including a travel planning system according to a second embodiment.

FIG. 15 illustrates an example of an entire system configuration including a travel planning system according to a second embodiment. Each mobile object includes a route planner 309 and a route plan storage 302, and the travel planning device 100 does not include a route planner. The route planner 309 has functions similar to those of the route planner 109 in FIG. 1.

The route planner 309 of each mobile object autonomously determines a route plan and stores the route plan in the route plan storage 302. Further, each mobile object transmits data of the route plan to the travel planning device 100 via the communicator 201 of the travel management device 200 or the communication device 501. The travel planning device 100 stores the route plan of each mobile object in the route plan storage 102. The route planner 309 does not have to be provided at each mobile object, and a rout (traveling paths) of each mobile object may be stored in the route plan storage 302 of each mobile object in advance.

In the second embodiment, a case is assumed where each mobile object is an autonomous type mobile robot including SLAM, an autonomous traveling vehicle, construction machine, or the like, and travels on the route (traveling paths) under management of the travel planning device 100 and the travel management device 200. Because the route plan of each mobile object is determined in advance or each mobile object autonomously determines a route plan, a case is assumed where the route plan of each mobile object cannot be freely changed on the travel planning device 100 side and the travel management device 200 side. Even in such a case, by appropriately generating the travel timing schedule at the travel planning device 100 and instructing each mobile object on the movement command data, it is possible to ensure traveling in which a collision, deadlock, or the like, does not occur. If the travel timing schedule which prevents occurrence of a collision or deadlock cannot be generated, the travel planning device 100 may transmit a request for changing the route plan to each mobile object via the travel management device 200.

Third Embodiment

Figure 16:
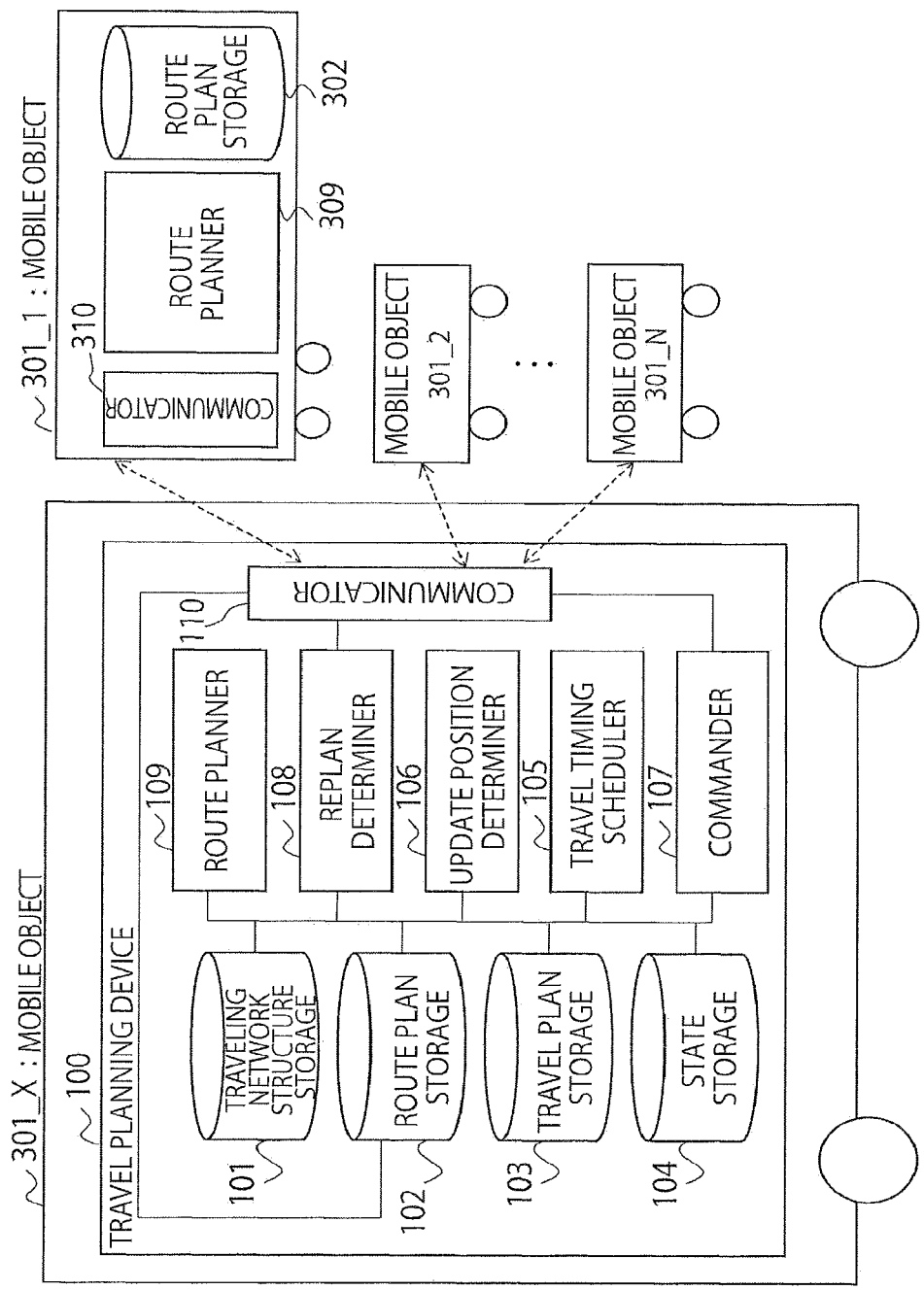
FIG. 16 is a diagram illustrating an example of an entire system configuration including a travel planning system according to a third embodiment.

FIG. 16 illustrates an example of an entire system configuration including a travel planning system according to a third embodiment. In the present embodiment, while basic functional parts are the same as those in the first or the second embodiment, at least one mobile object includes functions corresponding to the travel planning device (or the travel planning system). Other mobile objects include a route planner 309, a route plan storage 302 and a communicator 310. The communicator 310 performs wireless communication with other mobile objects.

One mobile object among mobile objects having functions corresponding to the travel planning device becomes a master. In the drawing, an example is illustrated where a mobile object 301_X becomes a master. The master may be determined through, for example, negotiation among mobile objects having functions corresponding to the travel planning device. Alternatively, the master may be determined in accordance with priority determined in advance. For example, a mobile object with the highest performance or a mobile object with a largest remaining battery amount may become the master. The master may be determined using other methods.

The route planners 309 of mobile objects other than the mobile object 301_X autonomously determine route plans, and then transmit the route plans to the mobile object 301_X which becomes the master. Alternatively, the route plans may be stored in advance in the route plan storage 302. In this case, the route planner 309 reads out data of the route plan within the route plan storage 302 without generating the route plan by itself and transmits the data to the master.

The mobile object 301_X which becomes the master collectively generates traveling timing schedules of a plurality of mobile objects including the own mobile object. The master generates a timing schedule of each mobile object so that the route plan of each mobile object is not changed. The mobile object 301_X transmits the movement command data based on the travel timing schedule of each mobile object to each mobile object. Each mobile object controls traveling on the basis of the movement command data. By this means, it is possible to realize efficient traveling as a whole in which a collision, deadlock, or the like, does not occur.

Mobile objects other than the mobile object 301_X do not have to include the route planner 309 and the route plan storage 302. In this case, the mobile objects other than the mobile object 301_X perform operation similar to that of the mobile object which can perform communication with the communicator 201 of the travel management device 200 among the mobile objects in the first embodiment.

The information detected by the state detector 202 in the first or the second embodiment is detected by each mobile object by itself in the third embodiment, and transmitted to the travel planning device 100 via the communicator 310.

In the third embodiment, a case is assumed where each mobile object is an autonomous type mobile robot which include SLAM, an autonomous traveling vehicle, construction machine, or the like, and travels in a travel network having a structure in which traveling in a reverse direction or passing occurs on a single-line traveling path. Because the route plan of each mobile object is determined in advance or each mobile object autonomously determines the route plan, a case is assumed where other persons cannot freely change the route plan. Also in such a case, by the mobile object which becomes the master appropriately generating the travel timing schedule and instructing each mobile object on the travel timing schedule, it is possible to ensure traveling in which a collision or deadlock does not occur. If the travel timing schedule which prevents occurrence of a collision or deadlock cannot be generated, the mobile object which becomes the master may transmit a request for changing the route plan to other mobile objects.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing apparatus for a plurality of mobile objects which travel in a travel network including a plurality of traveling paths, comprising:
   first processing circuitry configured to generate a plurality of traveling timing schedules including timings of traveling on the traveling paths for the plurality of mobile objects under a condition that conflict among the mobile objects does not occur on the traveling paths, based on:
   position information of the plurality of mobile objects;
   structure information of the travel network; and
   a plurality of route plans which designates order of passing through one or more designated areas in the travel network for the plurality of mobile objects; and
   second processing circuitry configured to transmit movement command data far the plurality of mobile objects on a basis of the plurality of traveling timing schedules, wherein
   the conflict includes at least one of
   existence of two or more of the mobile objects which travel in reverse directions on a traveling path at a same time,
   arrival of the two or more mobile objects at an intersection portion leading to the traveling path at a same time, or
   another mobile object passing through the traveling path in a state Where one or more of the mobile objects wait at an intersection portion leading to the traveling path.

2. The information processing apparatus according to claim 1,
wherein the first processing circuitry determines at least one of time at which the mobile obects arrive at the designated areas and time at which the mobile objects depart from the designated areas and generates the plurality of traveling timing schedules based on the at least one of time.

3. The information processing apparatus according to claim 1,
wherein the route plans include a condition regarding speed at which the mobile objects travel on the traveling paths, and
wherein the first processing circuitry generates the traveling timing schedules based on the condition regarding the speed.

4. The information processing apparatus according to claim 1,
wherein the first processing circuitry schedules to:
cause a first mobile object to wait at a position distant from one end portion of a traveling path or in a designated area before the one end portion and
cause a second mobile object to travel from another end portion of the traveling path to the one end portion of the traveling path during a time period when the first mobile object waits.

5. The information processing apparatus according to claim 1,
wherein the first processing circuitry adjusts speed of a first mobile object in a case where the first mobile object travels from another end portion of a traveling path to one end portion of the traveling path, and
wherein the first mobile object does not arrive at the other end portion before a second mobile object completes traveling from the one end portion of the traveling path to the other end portion of the traveling path.

6. The information processing apparatus according to claim 1,
wherein speed of a first mobile object on a traveling path is scheduled to be slower than speed of a second mobile object, and
wherein the first processing circuitry schedules to
cause the first mobile object to wait at a position distant from one end portion or in a designated area before the one end portion before the first mobile object enters from the one end portion of the traveling path, and
cause the second mobile object to travel from the one end portion of the traveling path to another end portion of the traveling path during a time period when the first mobile object waits.

7. The information processing apparatus according to claim 1,
wherein speed of a first mobile object on a traveling path is scheduled to be slower than speed of a second mobile object, and
wherein the first processing circuitry schedules adjust the speed of the second mobile object
wherein the second mobile object travels from one end portion to another end portion of the traveling path after the first mobile object arrives at the other end portion of the traveling path travels from the one end portion of the traveling path.

8. The information processing apparatus according to claim 1,
wherein the first processing circuitry
generates timing schedules for the mobile objects which specify at least one of time at which the mobile objects arrive at the designated areas and time at which the mobile objects depart from the designated areas based on the route plans of the mobile objects,
performs detection processing of detecting a traveling path on which conflict among the mobile objects occurs first for a set of the timing schedules,
determines a plurality of measures for avoiding the conflict and performs update processing of the set by changing a timing schedule of at least one of the mobile objects for which the conflict occurs in the set, for each of the determined measures, the updated sets are generated for the determined measures,
performs calculation processing of evaluation values of the updated sets,
performs selection processing of one of the updated sets based on the evaluation values,
performs searching which repeats the detection processing, the update processing, the calculation processing and the selection processing on the selected set,
selects one updated set among updated sets obtained through the search based on evaluation values thereof, and
determines the timing schedules included in the selected updated set as the travel timing schedules of the mobile objects.

9. The information processing apparatus according to claim 8,
wherein the first processing circuitry calculates the evaluation value based on a sum of: (1) delay times of the plurality of mobile objects until time at which the conflict occurs, and (2) predicted delay times depending on remaining traveling distances of the plurality of mobile objects after the time at which the conflict occurs.

10. The information processing apparatus according to claim 1,
wherein the second processing circuitry sequentially transmits a first command and a second command, as the movement command data,
wherein the first command instructs at least one of the mobile objects to stop at a position at which the at least one of the mobile objects should stop for waiting, and
wherein the second command instructs the at least one of the mobile objects to depart from the position where the at least one of the mobiles object waits.

11. The infomation processing apparatus according to claim 1,
wherein the second processing circuitry specifies passing order for the plurality of mobile objects to pass through the designated area based on the traveling timing schedules,
wherein the movement command data gives an instruction to pass through the designated area in accordance with the specified passing order, and
wherein the information processing apparatus further comprises communication circuitry configured to transmit identification information of mobile objects which have passed through the designated area to at least the mobile objects which have not passed through the designated area.

12. The information processing apparatus according to claim 1,
- wherein the first processing circuitry determines whether or not perform replan of the traveling timing schedules of the plurality of mobile objects based on the traveling tuning schedules and the position information of the plurality of mobile objects; and
- wherein the first processing circuitry determines update positions at which the traveling timing schedules are updated for the plurality of mobile objects in a case where the first processing circuitry determines to perform the replan,
- wherein the first processing circuitry updates plan portions after the update positions in. the route plans.

13. The information processing apparatus according to claim 12, further comprising:
- communication circuitry configured to perform communication with the mobile objects via at least one communication device disposed along at least one of the traveling paths in the travel network,
- wherein the update positions are positions within a range of communication with the at least one communication device, and
- wherein the second processing circuitry transmits the movement command data based on the updated traveling timing schedules to the mobile objects existing at the update positions.

14. The information processing apparatus according to claim 12,
- wherein the first processing circuitry determines whether arrival of the mobile object at the designated area is delayed by a period length equal to or longer than a threshold and,
- wherein the first processing circuitry determines to perform replan of the traveling, timing schedules of the plurality of mobile objects if the arrival is delayed.

15. The information processing apparatus according to claim 1,
- wherein the first processing circuitry generates the plurality of route plans of the plurality of mobile objects based on an evaluation criterion of reducing a sum of distances of the traveling paths traveled by two or more mobile objects travel in reverse directions at a same time.

16. The information processing apparatus according to claim 1, further comprising:
- communication circuitry configured to receive the route plans from the plurality of mobile objects,
- wherein the first processing circuitry generates the traveling timing schedules using the route plans received from the plurality of mobile objects.

17. A travel planning method for a plurality of mobile objects which travel in a travel network including a plurality of traveling paths, comprising:
- generating a plurality of traveling timing schedules including timings of traveling on the traveling paths for the plurality of mobile objects under a condition that conflict among the mobile objects does not occur on the traveling paths, based on:
  - position information of the plurality of mobile objects,
  - structure information of the travel network; and
  - a plurality of route plans which designates order of passing through one or more designated areas in the travel network for the plurality of mobile objects; and
- transmitting movement command data for the plurality of mobile objects on a basis of the plurality of traveling timing schedules, wherein
- the conflict includes at least one of:
  - existence of two or more of the mobile objects which travel in reverse directions on a traveling path at a same time,
  - arrival of the two or more mobile objects at an intersection portion leading to the traveling path at a same time, or
  - another mobile object passing through the traveling path in a state where one or more of the mobile objects wait at an intersection portion leading to the traveling path.

18. A non-transitory computer readable medium having a computer program stored Which, when executed by a computer, cases the computer to perform a travel planning method for a plurality of mobile objects which travel in a travel network including a plurality of traveling paths, the travel planning method comprising:
- generating a plurality of traveling timing schedules including timings of traveling on the traveling paths for the plurality of mobile objects under a condition that conflict among the mobile objects does not occur on the traveling paths, based on:
  - position information of the plurality of mobile objects;
  - structure information of the travel network; and
  - a plurality of route plans which designates order of passing through one or more designated areas in the travel network for the plurality of mobile objects; and
- transmitting movement command data for the plurality of mobile objects on a basis of the plurality of traveling timing schedules, wherein
- the conflict includes at least one of:
  - existence of two or more of the mobile objects which travel in reverse directions on a traveling path at a same time,
  - arrival of the two or more mobile objects at an intersection portion leading to the traveling path at a same time, or
  - another mobile object passing through the traveling path in a state where one or more of the mobile objects wait at an intersection portion leading to the traveling path.

\* \* \* \* \*